United States Patent [19]

Giannetti

[11] Patent Number: 5,933,934
[45] Date of Patent: Aug. 10, 1999

[54] BI-DIRECTIONAL ELECTRICAL MACHINE TOOL TURRET

[76] Inventor: Enrico R. Giannetti, P.O. Box 770785, Houston, Tex. 77215

[21] Appl. No.: 08/900,508

[22] Filed: Jul. 25, 1997

[51] Int. Cl.$^6$ ............................. B23Q 16/08; B23B 29/24
[52] U.S. Cl. ......................... 29/48.5 A; 29/40; 74/813 L
[58] Field of Search ........................... 29/39, 40, 48.5 A, 29/48.5 R; 74/813 L, 813 C, 820

[56] References Cited

U.S. PATENT DOCUMENTS

| | | | |
|---|---|---|---|
| 5,067,371 | 11/1991 | Sauterell | 74/813 L |
| 5,226,869 | 7/1993 | Thumm | 29/48.5 A |
| 5,632,075 | 5/1997 | De Bernardi et al. | 29/40 |
| 5,682,658 | 11/1997 | Roseliep | 29/48.5 A |

*Primary Examiner*—William R. Briggs
*Attorney, Agent, or Firm*—Bush, Riddle & Jackson, L.L.P.

[57] ABSTRACT

A bidirectional indexing turret mechanism for machine tools having a housing for mounting to a machine tool, with a spline being fixed to the housing. An indexing shaft is mounted for rotation within the housing and has a rotary turret support fixed thereto for supporting a turret having machining tools for machining a workpiece. The rotary turret support is a rotary spline having spline teeth positioned for registry with the teeth of the fixed spline. A locking spline is positioned about the indexing shaft and is movable to a locking position for locking engagement with the fixed and rotary splines and is movable to an unlocked position permitting rotation of said rotary turret support and the indexing shaft. A shaft driver having splined engagement with the indexing shaft is in positioning engagement with the locking spline and is movable linearly and rotatably by a roller driver supporting a plurality of drive rollers. The roller driver defines a gear which is driven by a transmission that is in turn driven by the output shaft of a bidirectional motor. A stopping pin is located within the housing and is selectively driven by a solenoid responsive to a positioning encoder for selectively stopping indexing rotation of the indexing shaft when a desired rotary location of the indexing shaft has been achieved. Precision axial location of the indexing shaft within the housing and precision force transmission of the roller driver to the shaft driver and locking spline is achieved by adjustment devices and disc springs.

24 Claims, 20 Drawing Sheets

FIG. 12
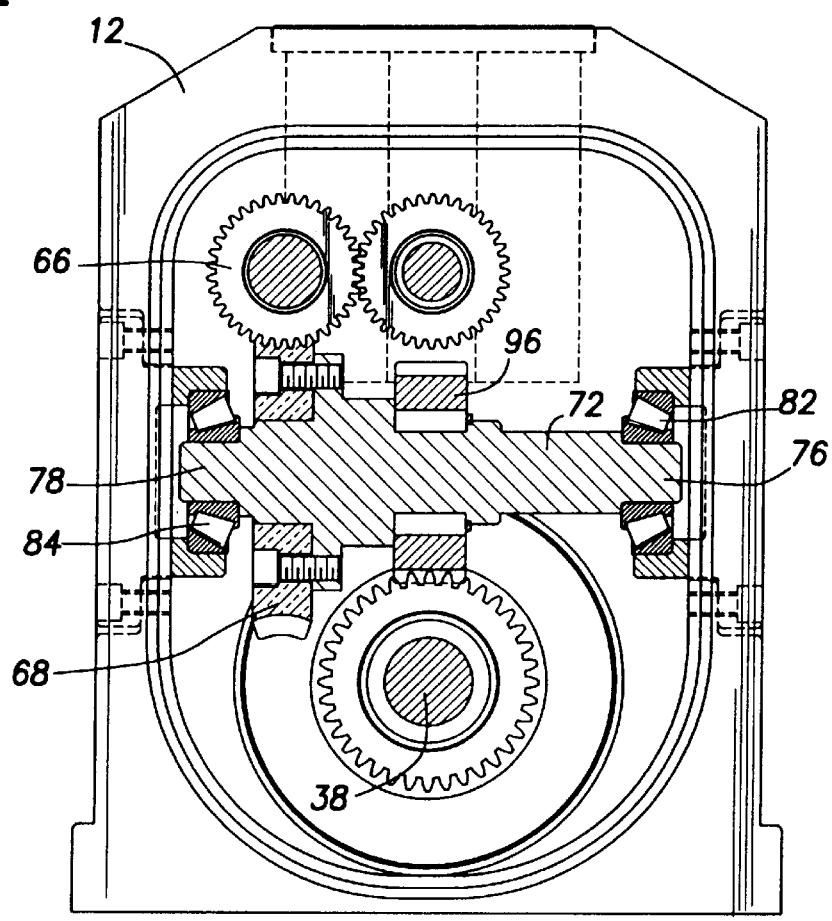
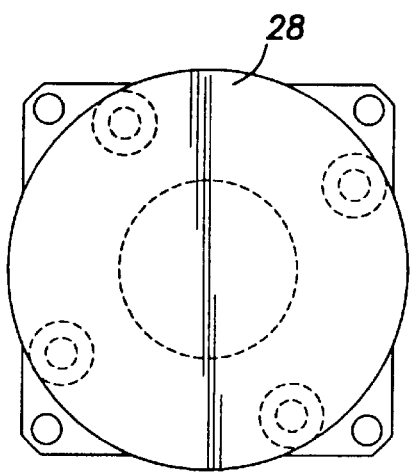
FIG. 13
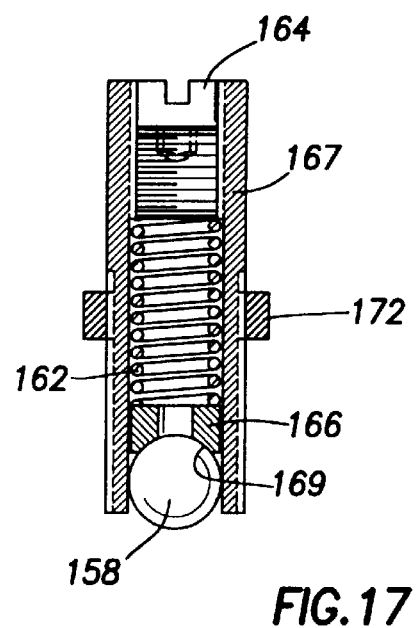
FIG. 17

BI-DIRECTIONAL ELECTRICAL MACHINE TOOL TURRET

BACKGROUND OF THE INVENTION

1. Field of the Invention

This invention relates generally to tool supporting and positioning turrets for metal working machines and the like and more specifically concerns a bidirectional electrically energized machine tool turret mechanism having a bidirectional electrical drive motor for selectively rotating and counter-rotating a turret drive shaft and a mechanism for locking and unlocking the turret indexing shaft responsive to position selection by an encoder.

2. Description of the Prior Art

It is well known that machining operations for various parts and objects require the use of a number of machining tools that are either moved against a work piece or maintained in a particular position or under particular control while the work piece is being moved such as by rotation, linear movement, etc. In order to enhance the productivity of various machine tools, a multi-position turret mechanism has been developed which can support a desired maximum number of machine tools and which can be indexed to position selected ones of the machine tools relative to a workpiece to be machined. In the past, these turret mechanisms have been largely of mechanical nature, requiring machinists to accomplish manual indexing. Though mechanically indexed turret mechanisms significantly enhance productivity of machine tools as compared to single tool-type metal working machines, it has been considered desirable to enhance productivity even more by providing mechanical turret mechanisms with power energized and encoder controlled indexing systems. Typically, power energized turret mechanisms are provided with reversible electric motors and are provided with an encoder mechanism having the capability of detecting the desired indexing position and to operate the motor at the proper rotational direction for reaching the desired turret position with the minimum amount of rotational movement. Virtually all electrically operated turret mechanisms have a tooth-driven, clutch mechanism in the gear driven shaft arrangement between the drive motor and the turret. Turret indexing is then accomplished by unlocking an indexing shaft and by then rotating the unlocked indexing shaft turret until the turret reaches its desired position. An indexing stop pin which is typically actuated by a solenoid, then engages within one of a plurality of indexing recesses of the indexing shaft to thereby lock the indexing shaft against further rotational movement, with the turret properly positioned as controlled by the encoder mechanism. It is well known that the tolerances of gears of the shaft drive mechanism and the inter engaging gear faces of the shaft locking mechanism must be closely controlled in order to provide a turret mechanism that is capable of performing quality work. If tolerances allow slight rotational movement of the main shaft and turret relative to predetermined turret positions at the location of the tools being supported by the turret, this slight rotational tool movement will be accentuated and thus will be quite significant. It is desirable therefore to provide an electric motor driven turret mechanism for machine tools having the capability for accommodating machine tolerances without materially increasing the cost of the turret mechanism so that the resulting turret mechanism will provide exceptionally high quality tool positioning and the resulting work performed by the machine tool can be of exceptionally high quality.

SUMMARY OF THE INVENTION

It is a principal feature of the present invention to provide a novel bi-directional, electrically energized, turret mechanism for machine tools which employs bi-directional electric drive motor and incorporates a unique indexing shaft locking, unlocking and positioning mechanism to thereby provide an electrically energized turret mechanism having exceptional tool positioning quality.

It is another feature of the present invention to provide a novel electrically energized, bidirectional turret mechanism incorporating means for accommodating relative wide manufacturing tolerances and which provides the turret mechanism with the capability of achieving precision tool positioning upon indexing to thereby provide efficient, high volume machining operations of exceptional quality.

Briefly, a bi-directional turret mechanism, constructed in accordance with the present invention and embodying the principles of this invention can be gear driven or belt driven by a uni-directional electric drive motor that imparts rotational driving through a gear or belt drive mechanism to a roller driver positioned about a turret indexing shaft to which a rotatable tool supporting turret is mounted in fixed relation therewith. The roller driver supports a plurality of drive rollers which are adapted to be received within roller recesses of a shaft driver having splined connection with the indexing shaft and which imports indexing rotation to the indexing shaft and is linearly movable relative to the indexing shaft. The main drive shaft has precision support within the main support block to promote accuracy of machining operations. A locking mechanism between the indexing shaft and housing permits indexing rotation of the indexing shaft for turret positioning and ensures locking of the indexing shaft during machining operations. The indexing shaft is locked, unlocked and rotated by a bidirectional electric motor acting through a gear or belt driven transmission.

In one form of the invention, a disc spring and shaft adjustment assembly is employed to accommodate manufacturing tolerances between the roller driver, the shaft driver and the indexing shaft of the rotatable turret. Thus, even though significant manufacturing tolerances are present that might otherwise result in inadvertent rotational movement of the indexing shaft, resulting in inaccuracy of the electric turret mechanism and thus lower quality machining capability then desired, these manufacturing tolerances are accommodated by a disc spring force adjustment system so that extremely accurate turret positioning is simply and efficiently maintained for achieving high quality, high production machining operations. This force adjustment feature permits the electric turret mechanism to be of relatively low cost as compared to other high quality turret mechanisms that accomplish accuracy of machining operations by closely controlled fit of the various parts of the turret drive mechanism so that precision rotational positioning of the indexing shaft and turret is provided.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a side sectional view of an electric motor energized by directional tool positioning turret mechanism for metal working machines which is constructed in accordance with the present invention and which shows the turret mechanism in the relocked and operating position;

FIG. 2 is a side sectional view similar to that of FIG. 1 and showing the bi-directional tool positioning turret mechanism in the unlocked position and during indexing of the tool supporting turret to a new tool position;

FIG. 3 is a sectional view in plan showing the electric motor of the bi-directional tool positioning turret mechanism and showing the turret mechanism in its locked position;

FIG. 4 is a sectional view in plan, similar to that of FIG. 3 and being taken along line 4—4 of FIG. 1 for showing the encoder and turret drive shaft with the turret mechanism in the locked position thereof;

FIG. 5 is a sectional view taken along line 5—5 of FIG. 2 and showing the stopping pin and damping systems of the turret mechanism;

FIG. 6 is a sectional view taken along line 6—6 of FIG. 2 and showing the roller drive mechanism with its three-cam followers;

FIG. 7 is a sectional view taken along line 7—7 of FIG. 1 and showing the shaft drive mechanism of the electrically energized bi-directional turret with its shaft splines and cam follower slots;

FIG. 8 is a view taken along line 8—8 of FIG. 7;

FIG. 9 is a fragmentary sectional view taken along line 9—9 of FIG. 7;

FIG. 10 is a side elevational view of the electrically energized bi-directional turret mechanism shown in FIGS. 1–9;

FIG. 11 is a plan view of the electrically energized bi-directional turret mechanism of this invention, being shown with the top cover thereof removed;

Figure 2:
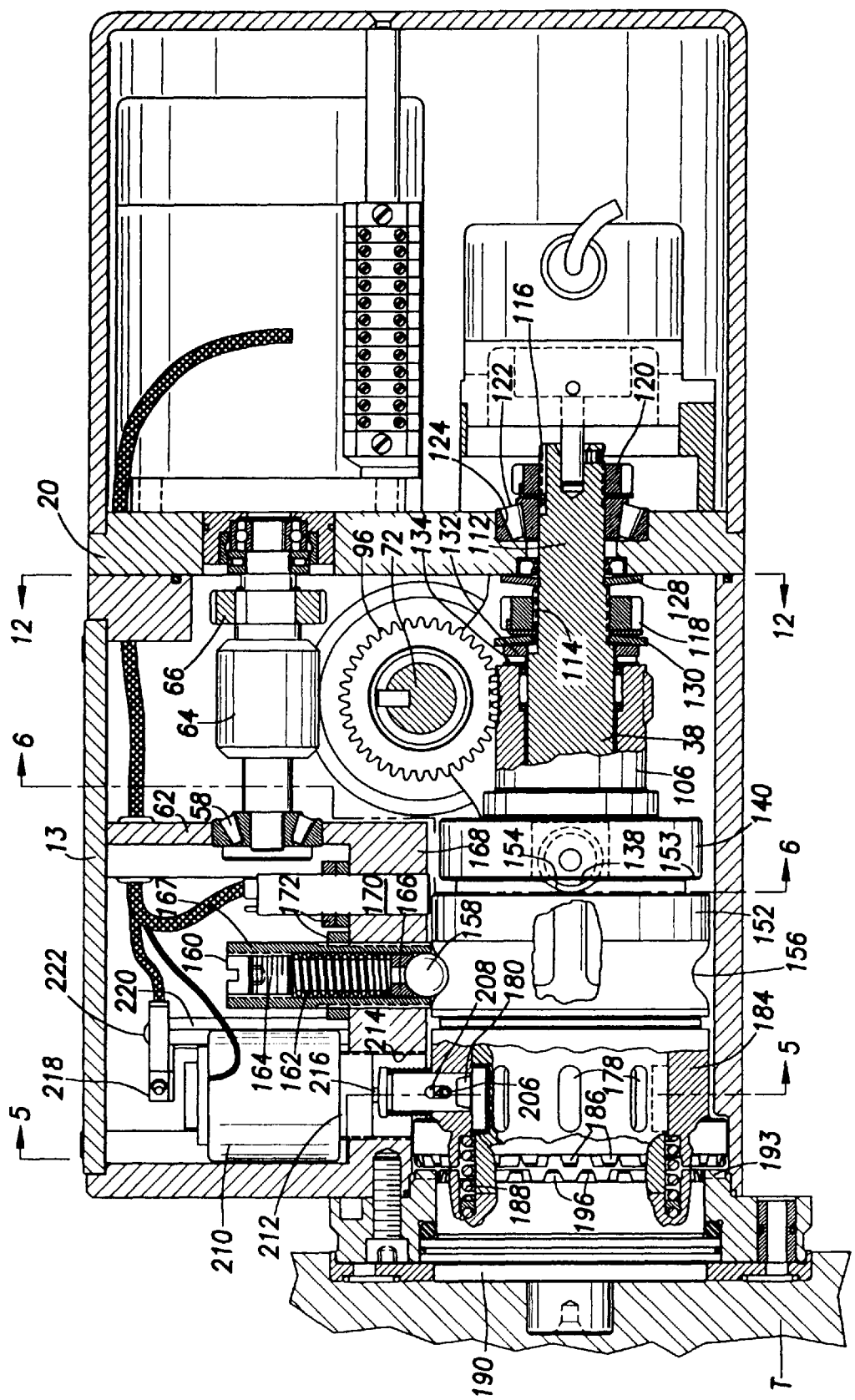
Figure 14:
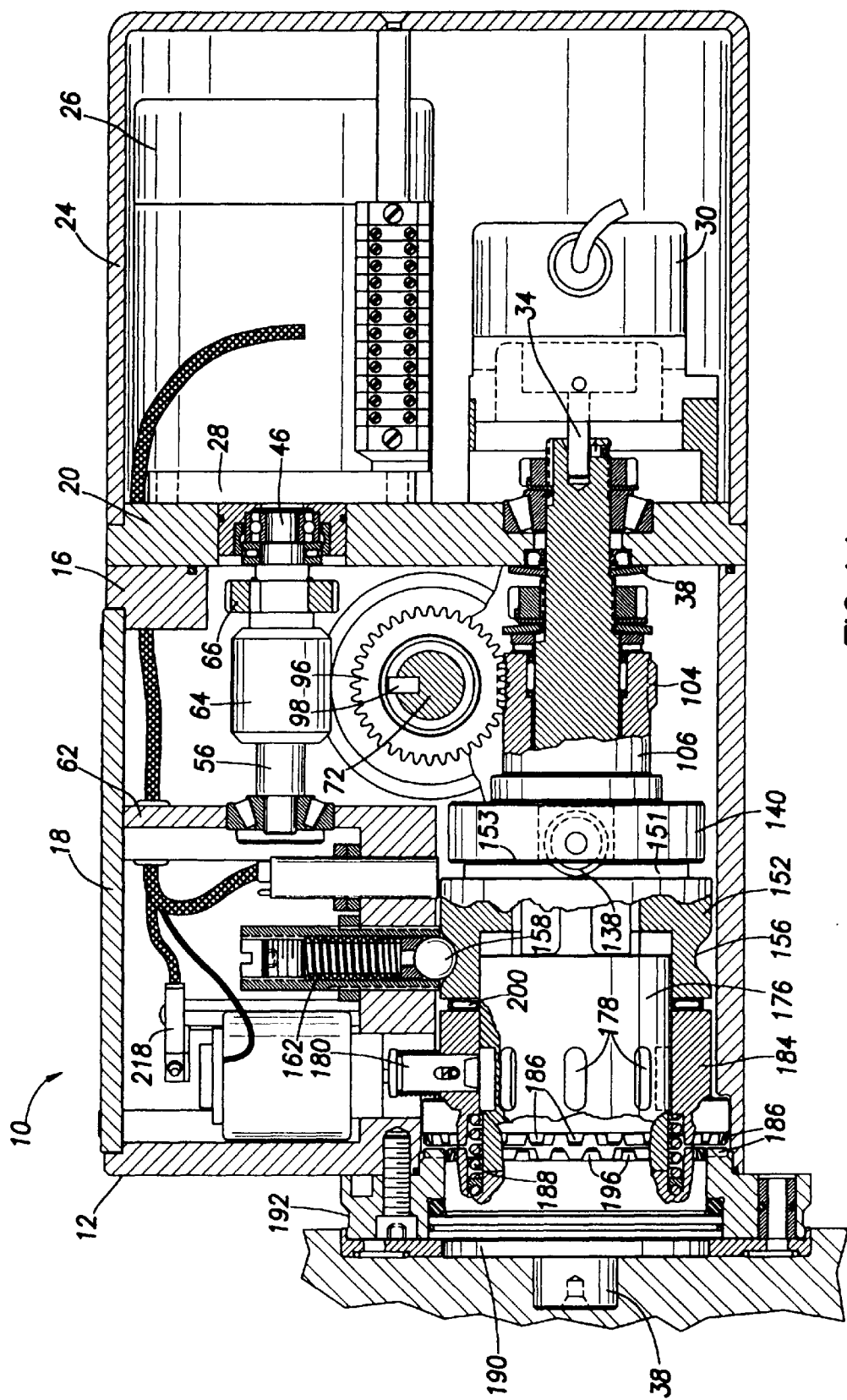
Figure 15:
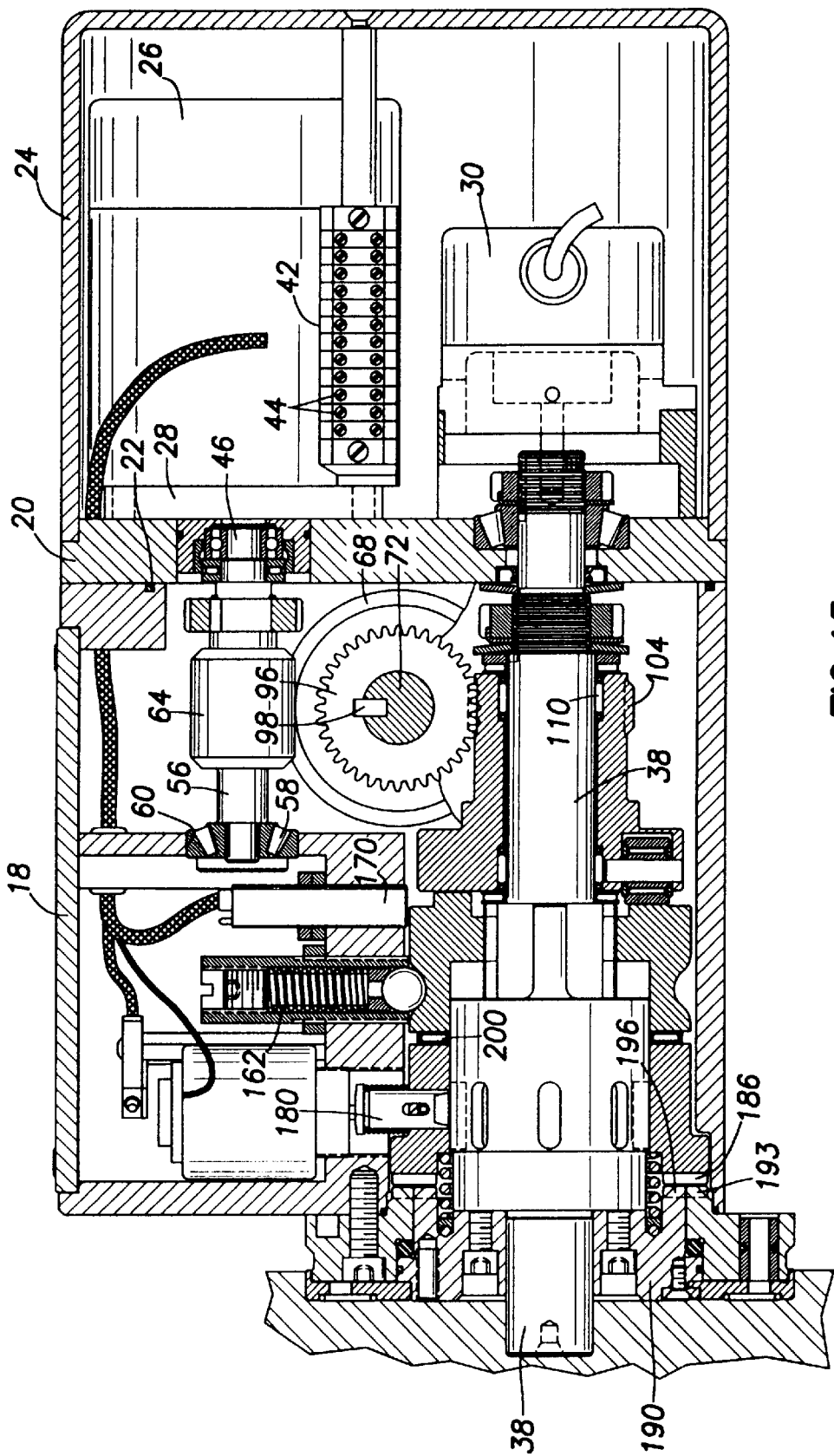
Figure 16:
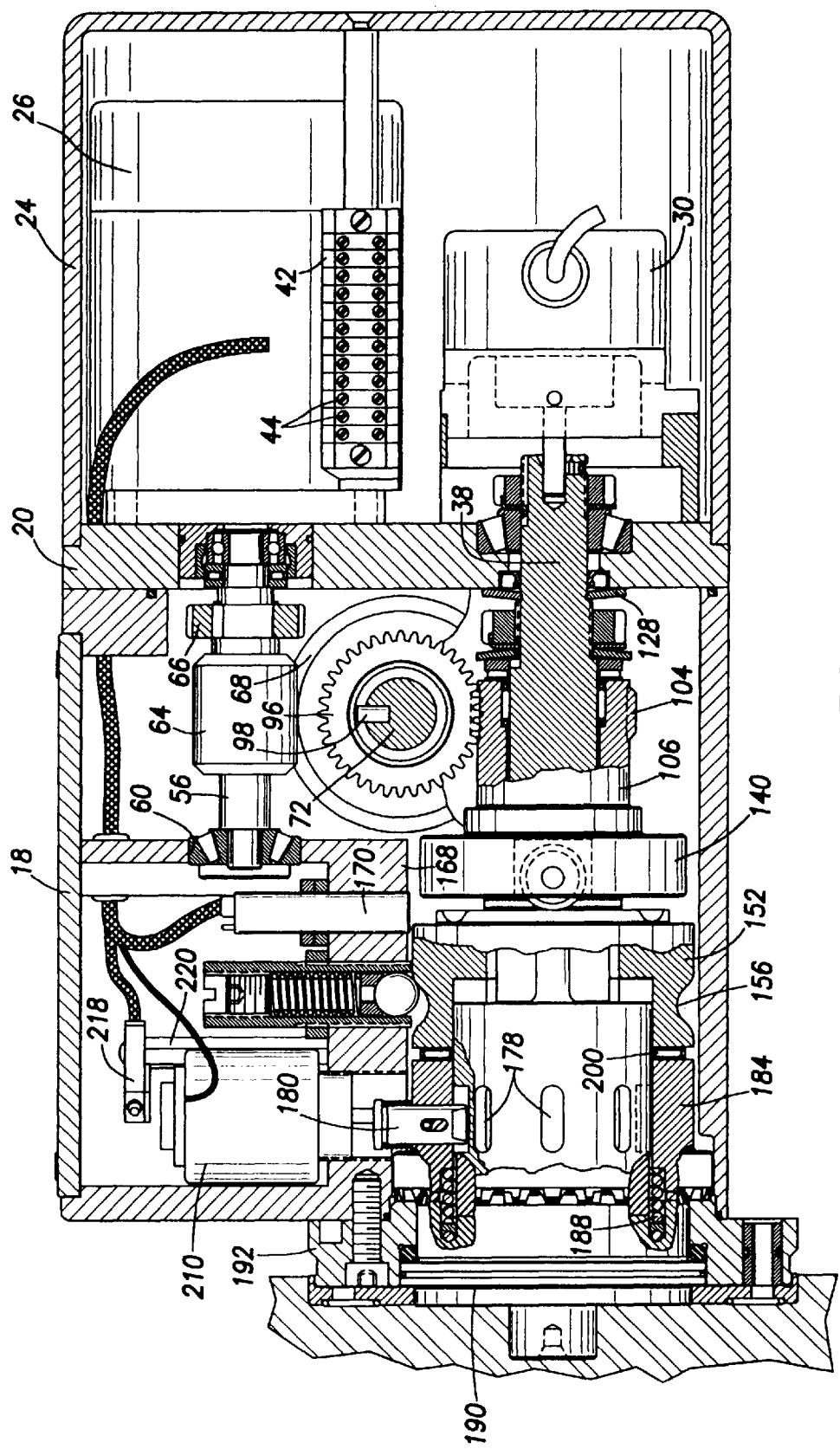
Figure 18:
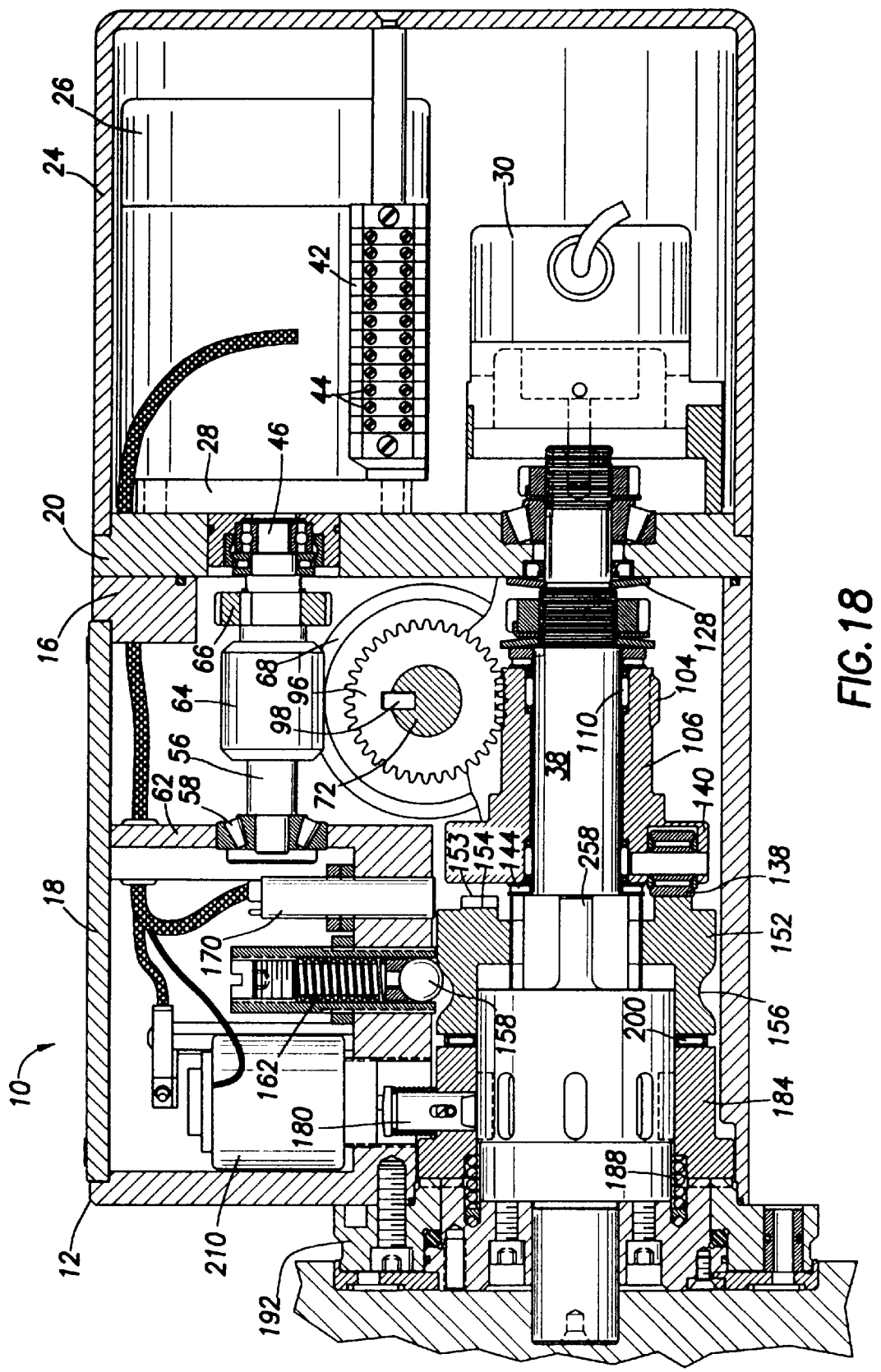
Figure 19:
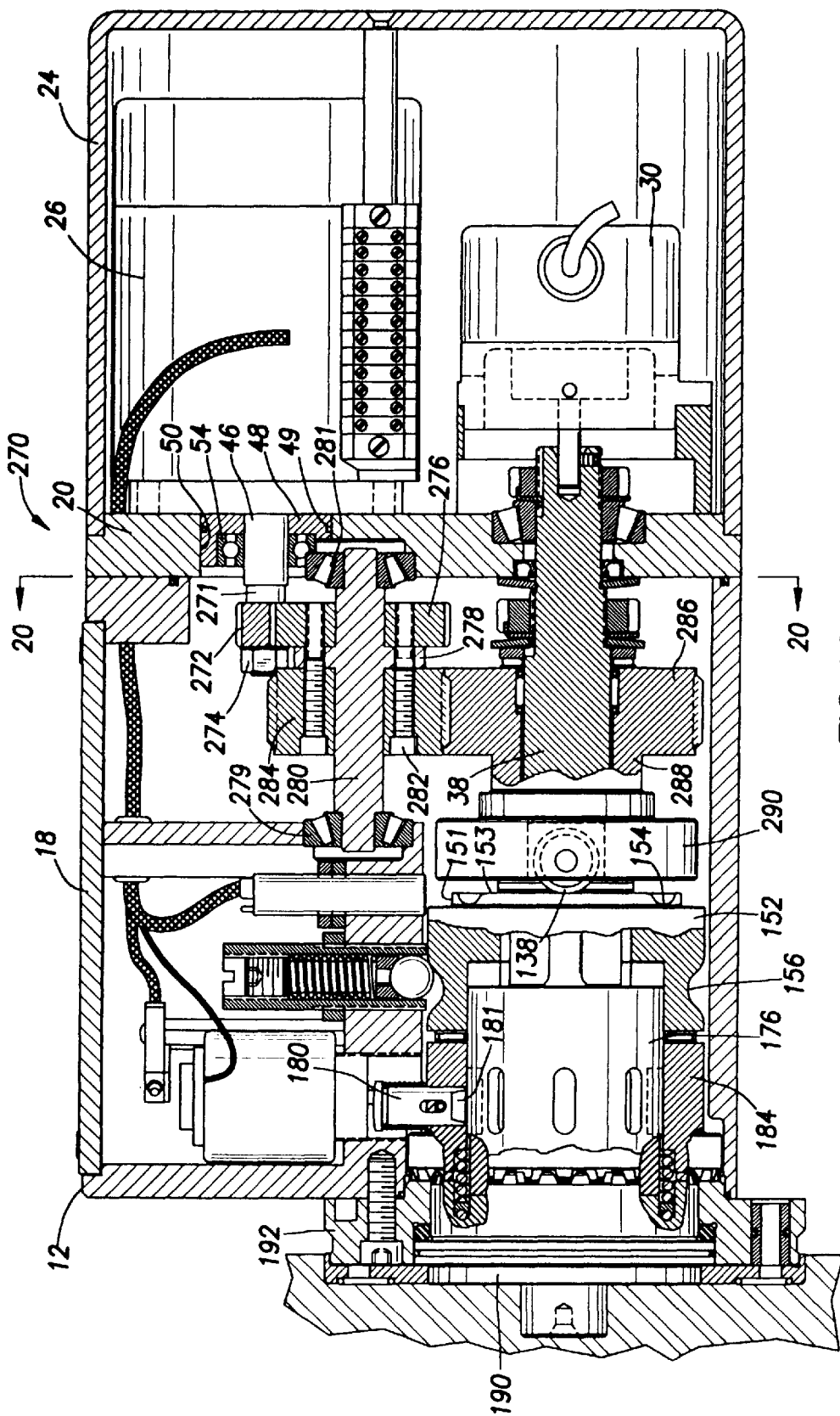
Figure 20:
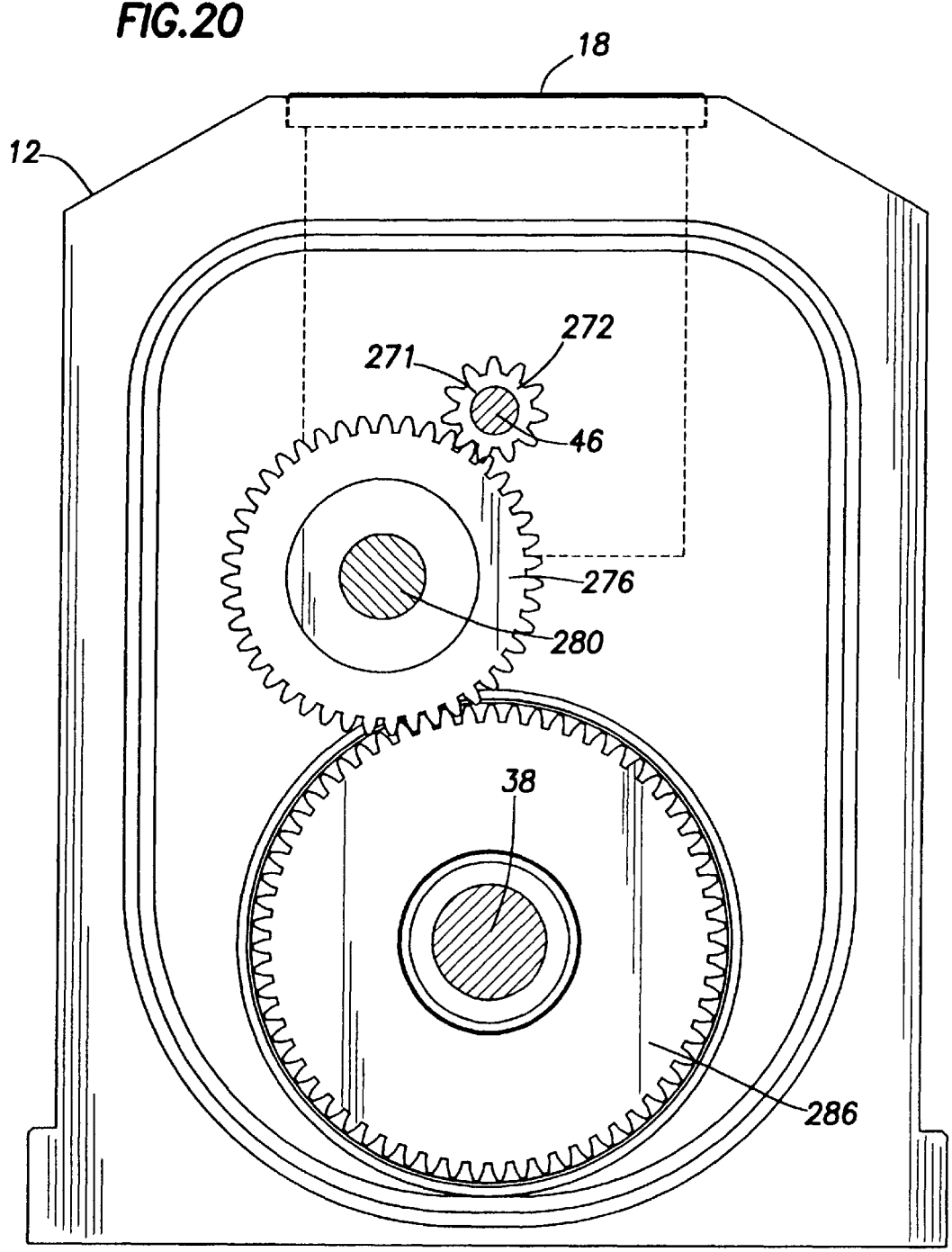
Figure 21:
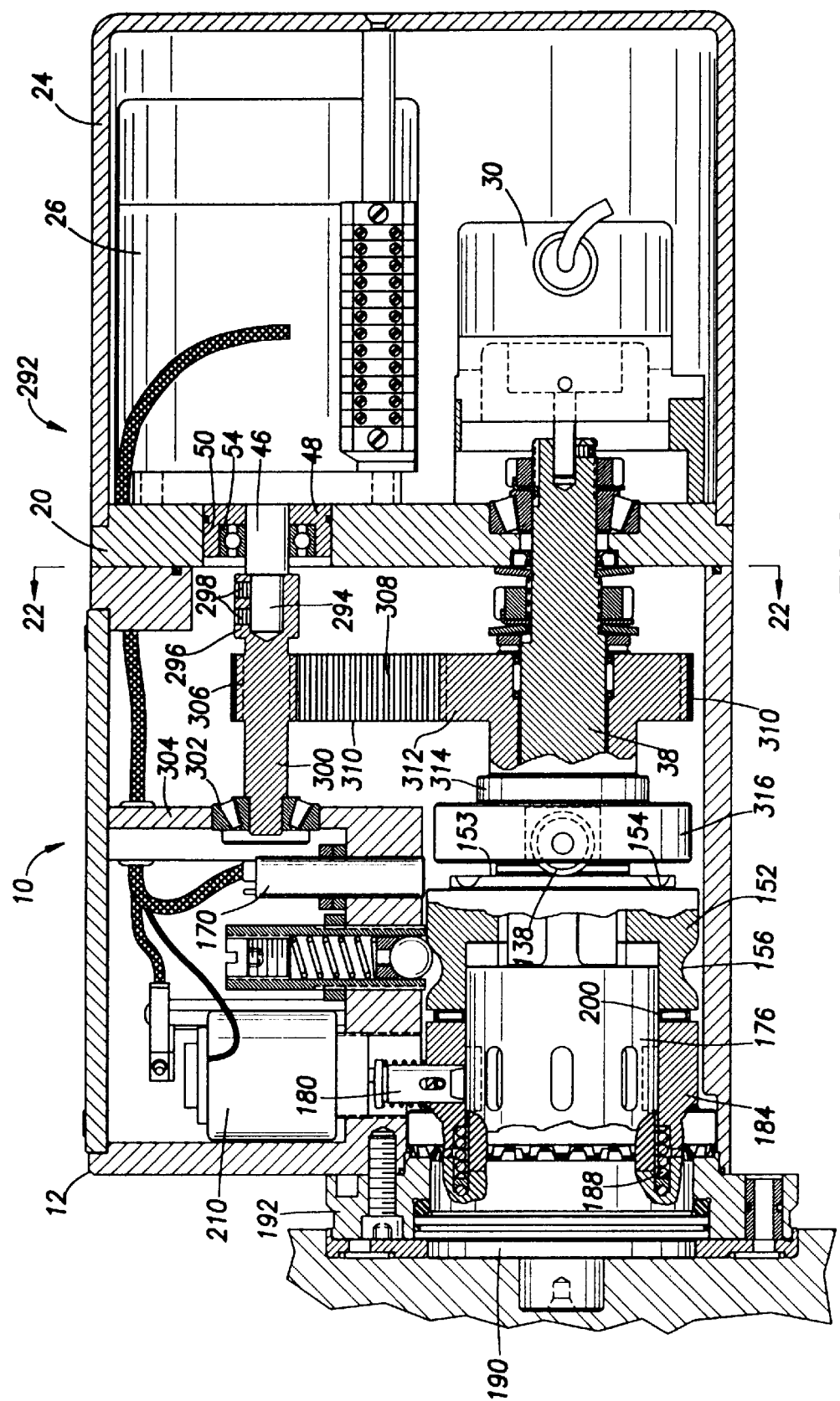
Figure 22:
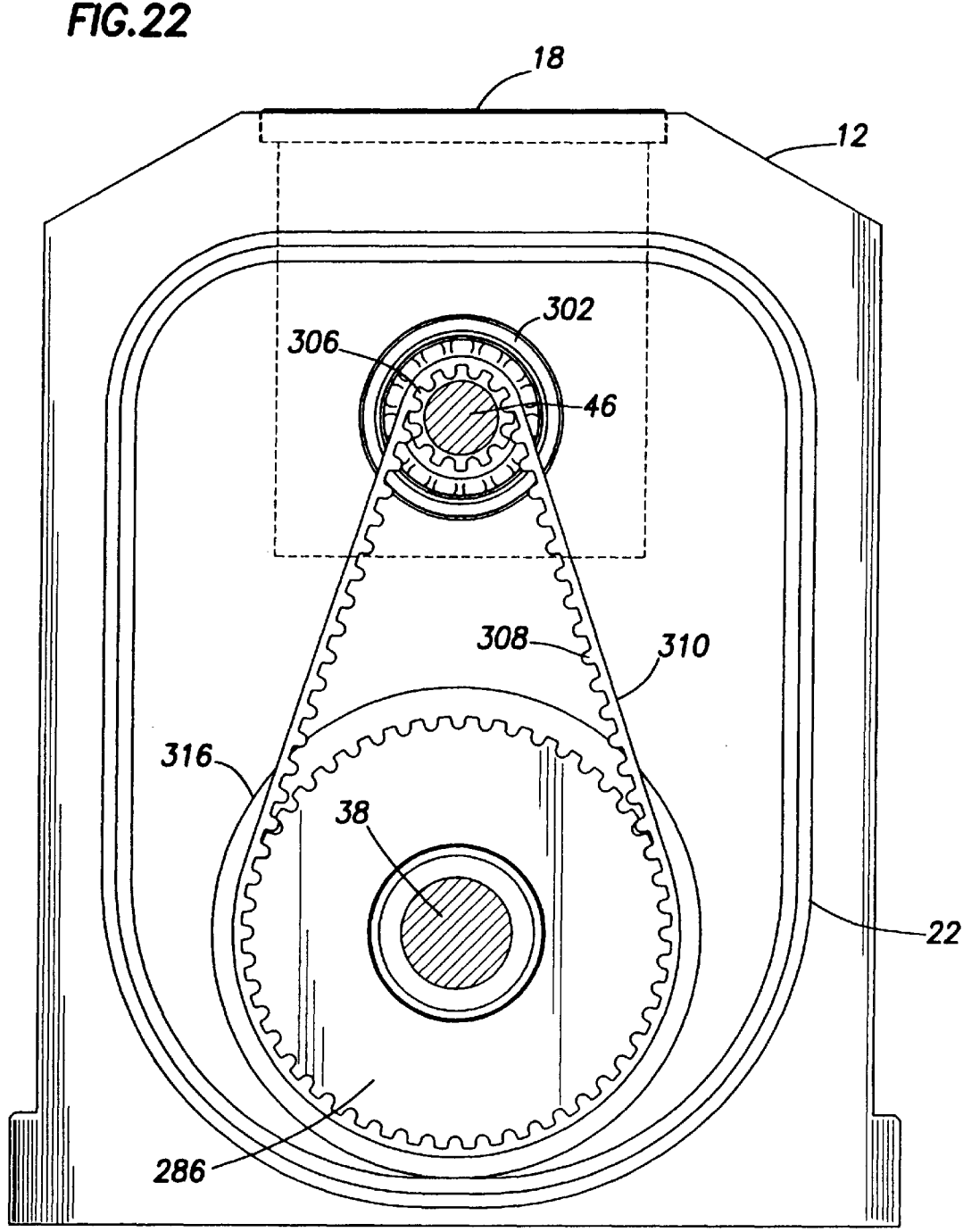

FIG. 12 is an end view of the turret housing block of the turret mechanism taken along line 12—12 of FIG. 2, with the mechanism being shown with the back cover plate and motor/encoder housing being removed;

FIG. 13 is an elevational view of the motor mounting plate which is fixed to the back cover plate and located within the motor/encoder housing of the turret mechanism;

FIG. 14 is a sectional view similar to that of FIG. 2 and showing the turret mechanism in the unlocked and indexing position;

FIG. 15 is sectional view similar to that of FIG. 14 and showing the turret mechanism in the unlocked and indexing position thereof with the main drive shaft being shown in side elevation;

FIG. 16 is a sectional view similar to that of FIG. 14 and showing the bi-directional turret mechanism in the locked position, with the stopping pin shown to be positioned downwardly by its solenoid, with the lower end thereof being located within an indexing pin slot of the main drive shaft;

FIG. 17 is a sectional view showing the detailed structure of the resistance ball housing assembly;

FIG. 18 is a sectional view similar to that of FIG. 15, with the main drive shaft being shown in elevation and with the electrically energized, bidirectional turret mechanism being shown in the relocked and operational position;

FIG. 19 is a sectional view showing an alternative embodiment of the present invention having a gear drive mechanism and showing the electrically energized bidirectional turret mechanism in the relocked, operation able position;

FIG. 20 is an end view of the main housing assembly of the turret mechanism being taken along line 20—20 of FIG. 19;

FIG. 21 is a sectional view of a further alternative embodiment of the present invention showing a geared belt drive system therefore; and FIG. 22 is an end view taken along line 22—22 of FIG. 21.

Figure 23:
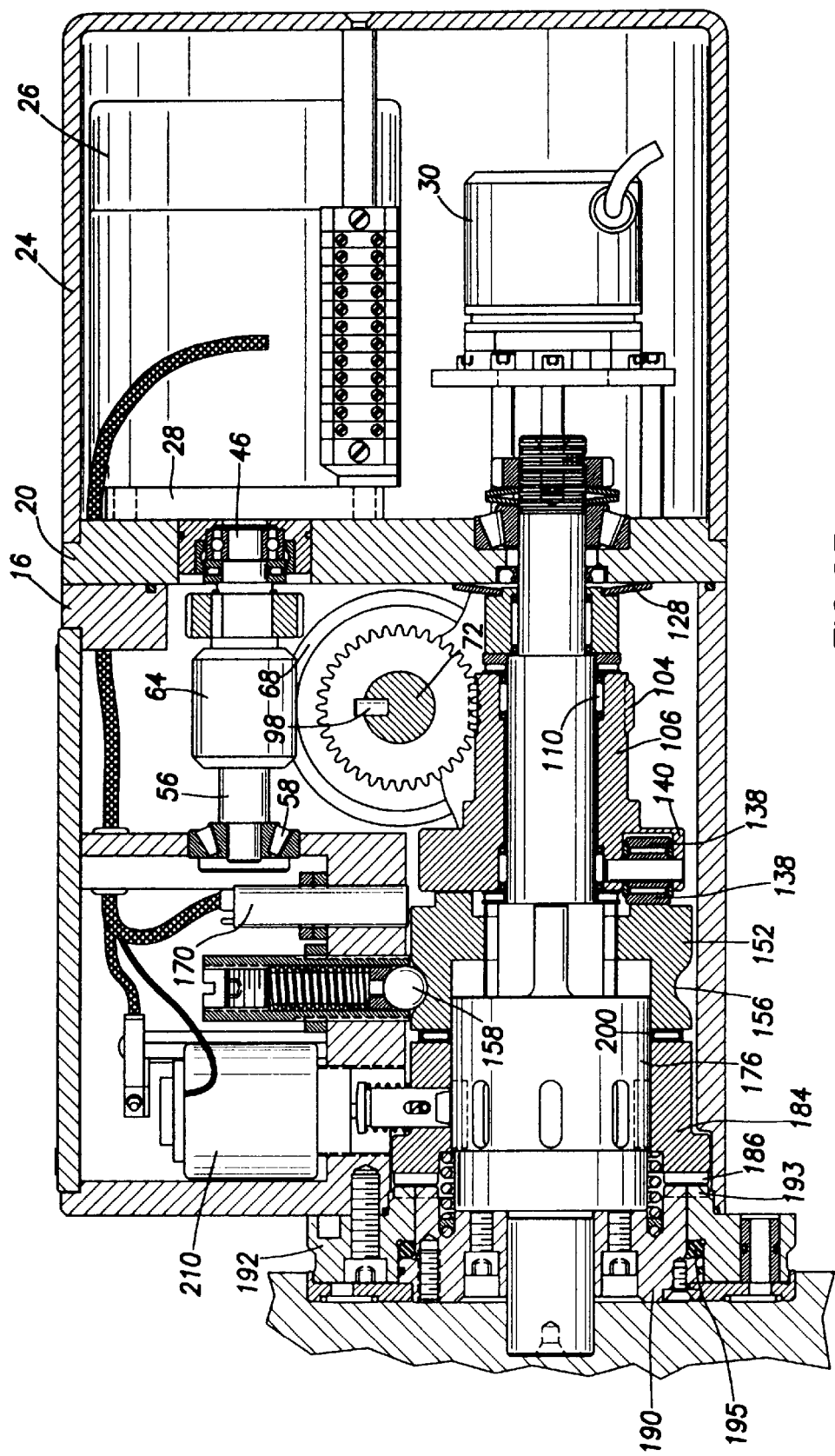
Figure 24:
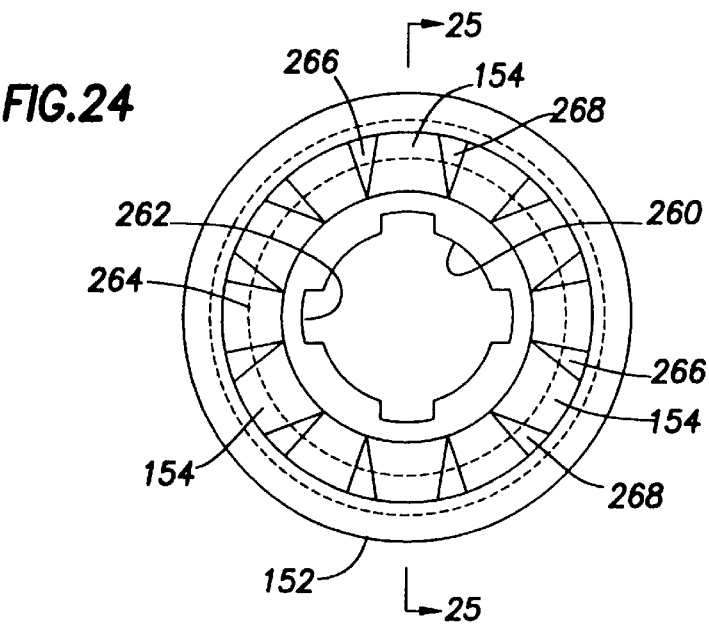
Figure 25:
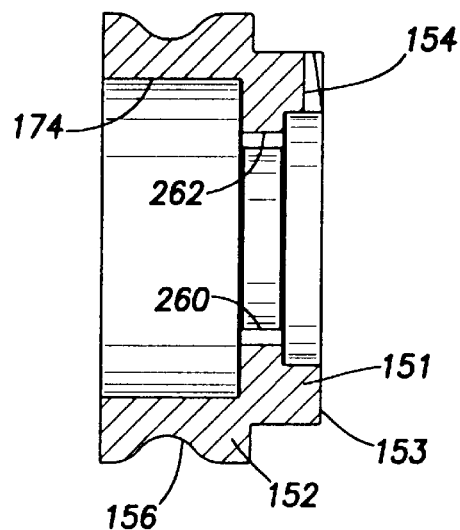

FIG. 23 is a sectional view taken in side elevation and being similar to the sectional view of FIG. 15, this embodiment presenting a disc spring assembly for accommodating tolerances of the roller driver and shaft driver mechanism to thus permit relatively low cost manufacture of the electrically energized turret mechanism without any sacrifice from the standpoint of precision machining;

FIG. 24 is an elevational view of the shaft driver component of the motor and gear energized roller driver for accomplishing rotational driving of the turret indexing shaft and geared locking and unlocking mechanism thereof;

FIG. 25 is a sectional view taken along line 25—25 of FIG. 24; and

Figure 26:
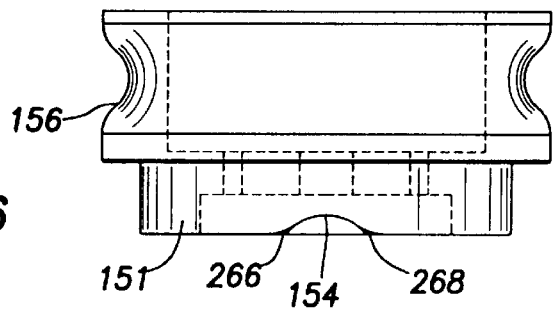

FIG. 26 is a plan view of the shaft driver, further showing the roller drive groove geometry of FIGS. 24 and 25 which minimize point loading of the drive rollers relative to the drive slots.

DETAILED DESCRIPTION OF PREFERRED EMBODIMENT

Figure 1:
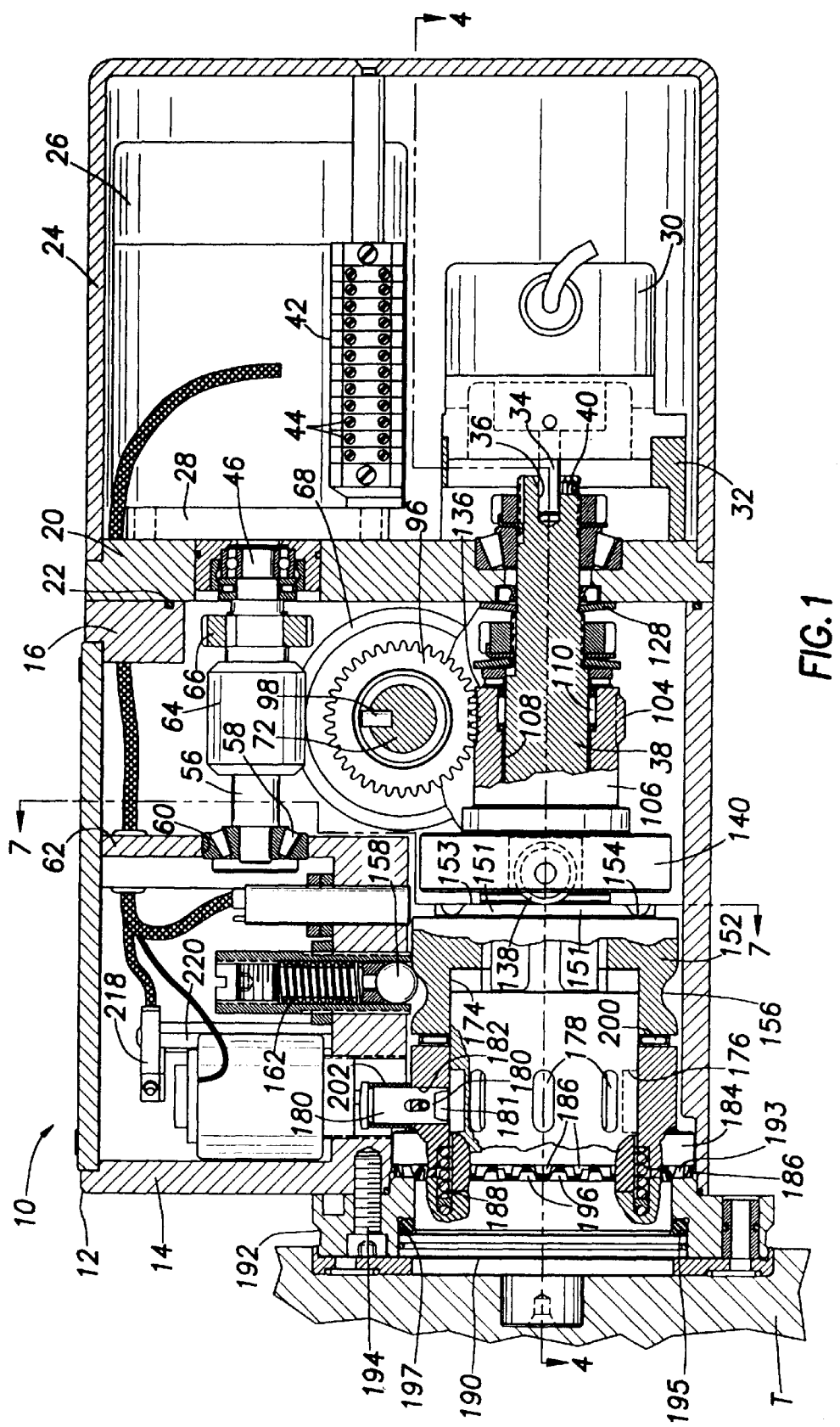
Figure 10:
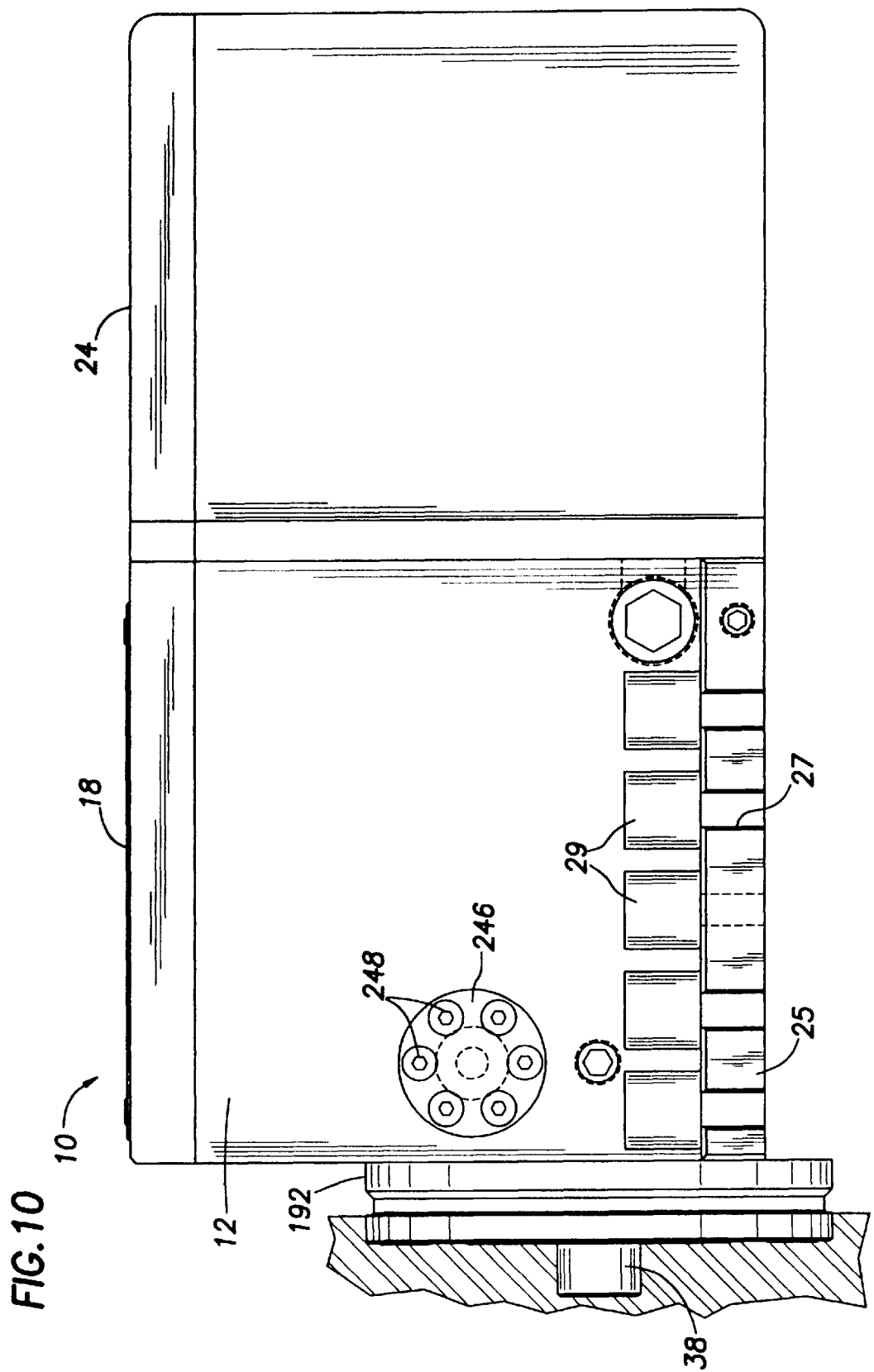
Figure 11:
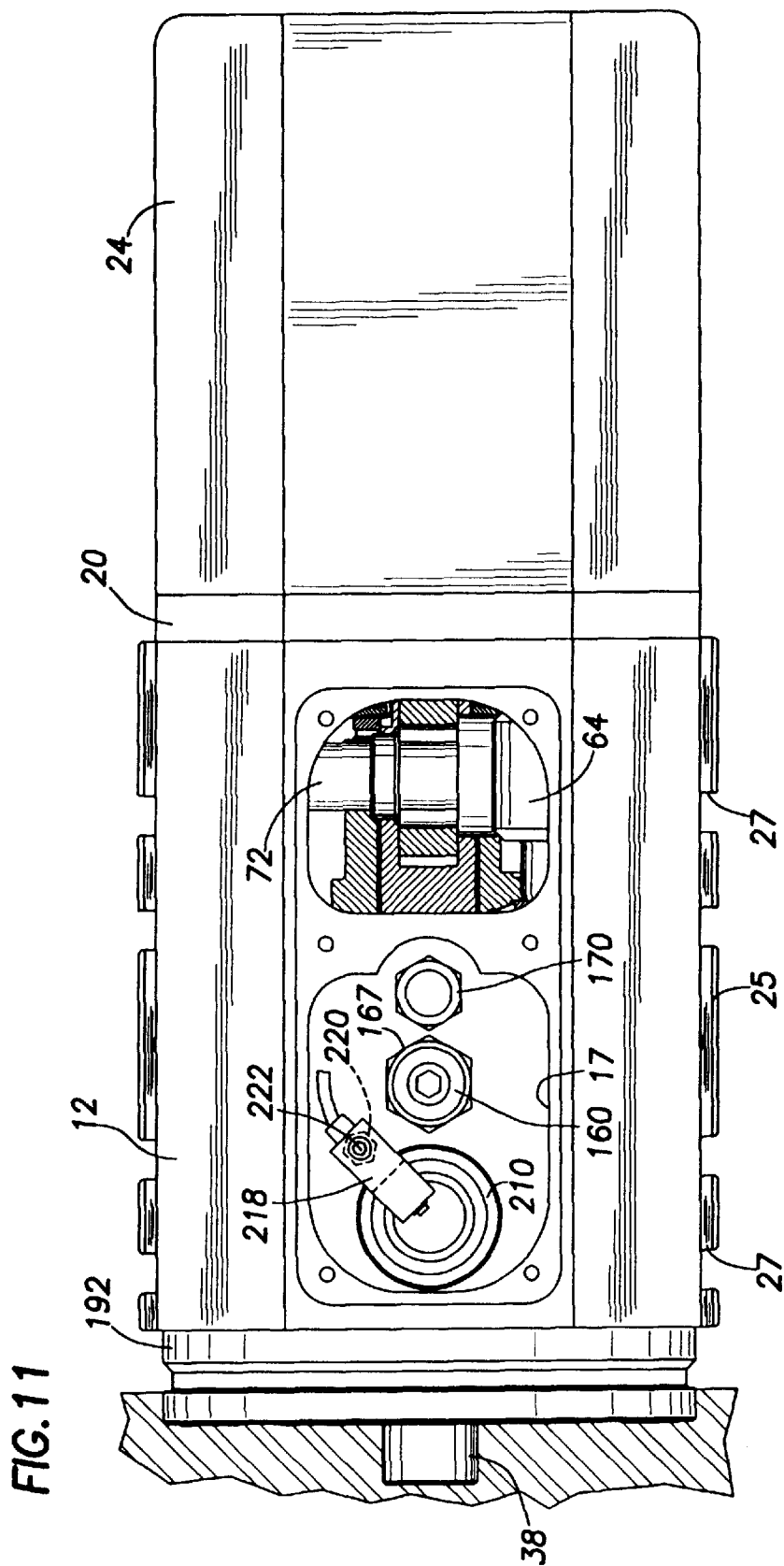

Referring now to the drawings and first to FIG. 1, an electrically energized bi-directional turret mechanism constructed in accordance with the present invention is shown at generally at 10 having a main housing block 12 having front and rear housing end walls 14 and 16 and defining an access opening 17 that is closed by a removable access cover 18. To the rear end wall 16, there is mounted a back plate 20 that is sealed with respect to the rear end wall by means of a circular sealing element 22 that is positioned within a seal groove of the rear end wall of the housing block. A motor/encoder housing 24 is mounted to the rear plate 20 to thus provide protection for a bidirectional electric motor 26 and an absolute encoder 30. A motor mounting plate 28 is fixed by a plurality of bolts to the rear plate 20 and defines a mount from which the bi-directional motor is supported. The rear plate 20 also provides support for the absolute encoder 30 which is secured by an encoder housing 32 to the back plate 20 such as by means of cap screws or the like. The encoder 30 has a position indicating shaft 34 having its end fixed within a receptacle 36 of an indexing shaft 38. The encoder shaft is adjustable relative to the indexing shaft by a set screw 40 so that the encoder shaft can be correlated with the position of the indexing shaft during the assembly procedure. The housing 24 also provides protection for an electrical terminal block assembly 42 and the various electrical conductors that are connected to the terminal block assembly by conductor screws 44 as shown best in FIG. 10, the housing block defines mounting flanges 25 at its lower portion having slots 27 that receive bolts 29 for securing the housing to a machine tool such as a lathe.

Figure 3:
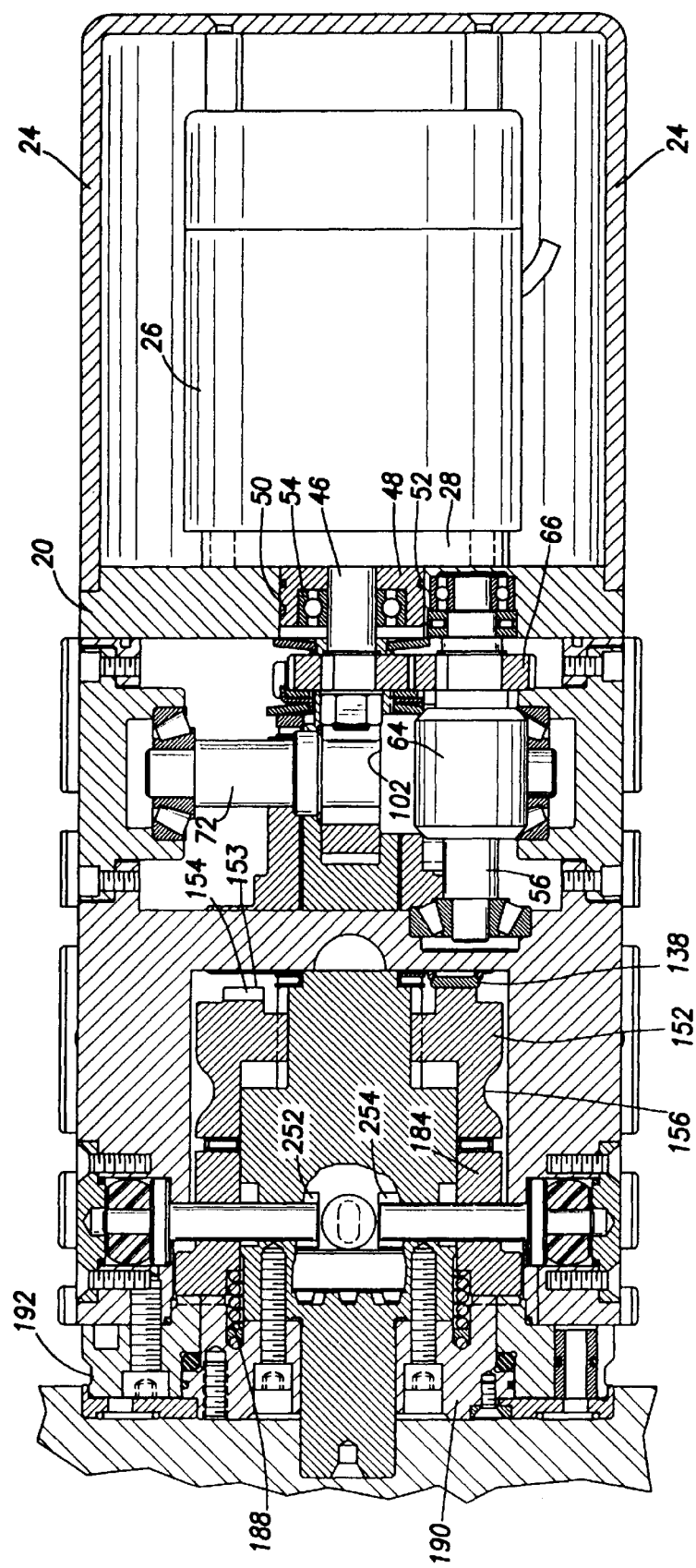

As shown best in FIG. 3, a rotary output shaft 46 of the electric motor 26 extends through a motor mount 48 which is received by an opening 50 of the back plate 20 and is sealed with respect to the back plate by means of a circular sealing element 52. The motor mount 48 is provided with a ball bearing 54 having its inner race positioned about the output shaft 46. The output shaft of the motor is coupled in direct driving relation with a worm gear shaft 56 having the end thereof opposite the output shaft of the motor being supported by a cone bearing assembly 58 which is mounted within an aperture 60 of an internal transverse wall 62 of the main support block 12. The worm gear represents the initial motor shaft driven element of a transmission mechanism that imparts selective drawing rotation to the indexing shaft and also causes selective locking and unlocking of the indexing shaft relative to the housing. A worm 64 and a helical gear 66 are keyed to and supported by the shaft 56 and thus are rotatable directly by the output shaft of the motor. The worm 64 is coupled in driving relation with a worm gear 68 that is fixed to a mounting flange 70 of a transversely oriented jack shaft 72 by a plurality of cap screws 74. Respective ends 76 and 78 of the jack shaft 72 are supported by respective conical bearing assemblies 82 and 84, respectively, by bearing/shaft mounting elements 86 and 88 that are secured by cap screws 90 within respective recesses 92 and 94 of the main housing block 12. A helical gear 96 is fixed to the jack shaft 72 by a key 98 as shown in FIG. 1 and by a retainer ring 100 that secures the helical gear against a gear positioning shoulder 102 of the jack shaft 72.

The teeth of the helical gear 96 are disposed in driving relation with a helical gear 104 that is machined at one end of a roller driver 106. The roller driver defines a central bore 108 thorough which the indexing shaft 38 extends. A bearing assembly 110 is received within an internal recess of the roller driver and establishes bearing controlled alignment of the roller driver relative to the indexing shaft. An end portion 112 of the indexing shaft 38 extends through an opening that is defined in the back plate 20 and defines threaded sections 114 and 116 that receive lock nuts 118 and 120, respectively. Lock nut 120 is also an adjustment nut which functions to precisely position the indexing shaft relative to a conical bearing assembly 122 which is located within a bearing recess 124 of the back wall and to thereby stabilize rotation of one end of the indexing shaft 38. Lock nut 118 is received for adjustment by the threaded section 114 of the indexing shaft and serves to adjust the force transmission of the disc spring 130 and to thereby control the force being applied through the roller driver to the shaft driver and locking spline the disc spring accommodates the machined tolerances of the indexing shaft positioning components and thus ensures that when the indexing shaft rotatably is positioned and locked that virtually no rotational movement of the indexing shaft can occur relative to the housing. Thus, the turret supported by the rotary spline fixed to the indexing shaft is precisely rotationally as well as axially positioned and becomes virtually immovable at each indexed station thereof so that the machining operation being conducted at each turret station is of exceptionally high quality. A single lip seal 126 is received within a circular recess that is defined by the back plate 20 and established sealing engagement with a cylindrical section of the main shaft to minimize leakage of any lubricant along the main shaft into the motor/encoder housing 24. A disc spring 128 is positioned with its inner periphery in engagement with a circular shoulder that is defined at one end of the threaded section 114 and with its outer periphery disposed in force transmitting engagement with the inner surface of the back plate 20. The disc spring 128 provides resistance to outward shaft movement by the adjustment nut 120 so that linear indexing shaft movement will not occur with respect to the back plate. A second disc spring 130 is positioned with its inner periphery in engagement with the lock nut 118 so that force transmitted by the adjustment nut 118 is transmitted through the disc spring 130 to a thrust washer 132. A thrust bearing 134 is interposed between the thrust washer 132 and an end surface 136 of the roller driver 106 so that the roller driver is rotatable relative to the adjustment mechanism and simultaneously force of the disc spring 130 is transmitted through the thrust bearing to the roller driver. The adjustment nut, disc spring and thrust bearing assembly thus provide for transmission of a roller seating force to a plurality of drive and positioning rollers 138 that are rotatably carried by a large end flange 140 of the roller driver 106. The drive and positioning rollers are supported by roller mounting pins 142 which extend through pin receptacles of the end flange 140. The end flange 140 of the roller driver is shouldered against a thrust bearing 144 which is seated against a circular shoulder 146 of the main shaft thus assuring rotation of the roller driver relative to the indexing shaft and ensuring axial force transmission to the indexing shaft to accommodate tolerances of indexing components. Adjacent the circular shoulder 146, the indexing shaft defines an externally splined section 148 which is adapted to receive the internal spline section 150 of a shaft driver 152 that is moveable along the length of the external spline section. The shaft driver defines a circular axially projecting rim having a planar end surface 153 and having plurality roller recesses 154 having a circular geometric configuration matching the circular outer surface of the drive and positioning rollers 138. The shaft driver 152 also defines an external, circular positioning groove 156 which is engaged by the positioning ball 158 of a ball housing assembly 160. The ball having assembly has an internal ball drive spring 162, with the spring force thereof being adjusted by an adjustment element 164 which engages internal adjustment threads of the housing. The lower end of the ball drive spring engages a ball follower 166 which defines a concave, spherical receptacle 169 for driving engagement with the positioning ball 158. The ball housing assembly defines a housing 167 which is externally threaded and is received within an internally threaded aperture of an internal portion 168 of the main housing block. The internal portion 168 also provides support for a proximity switch 170 which is also externally threaded is received within an internally threaded opening of the portion 168. The positions of the ball housing assembly and the proximity switch are adjustable relative to the portion 168 by means of adjustment nuts shown at 172. The external circular groove 156 of the shaft driver 152 is of contoured configuration as shown in FIGS. 1 and 2, so that when the ball 158 of the ball housing assembly is offset relative to the groove 156, the ball will exert a caming activity on the shaft driver imparting a lateral force which tends to move the shaft driver to the right as shown in FIG. 1 so as to bring the roller recesses 154 into intimate driven relation with the rollers 138 of the roller driver 106. The shaft driver 152 defines an internal recess 174 within which is received an enlarged indexing section 176 of the main shaft 38. The indexing section 176 defines a plurality of indexing apertures 178 which are adapted for engagement by a stopping pin 180 which is received within an aperture 182 of a locking spline 184 having positioning gear teeth 186 arranged in a circular array at one end thereof. The locking spline 184 is spring energized by a compression spring assembly 188 that is located within a circular spring recess that is defined in part by the locking spline and in part by a rotating spline 190 to which a turret "T" is adapted to be connected by bolts or the like. The compression spring 188 is also captured within the circular spring recess by the external cylindrical surface of the main shaft enlargement 176. The rotating spline 190 is located within a circular, central opening of a circular, fixed spline 192 that is secured to the main housing support block by a plurality of bolts 194. The fixed spline defines a circular array of looking teeth 193 which are oriented in adjacent and concentric relation with the circular array of locking teeth 196 of the rotating spline. Bearing balls 195 a captured within a circular bearing recess 197 that is cooperatively defined by the rotary spline 190 and the fixed spline 192, thus providing for rotatable support of the indexing shaft relative to the housing.

The rotating turret support spline 190 is provided with a circular array of positioning teeth 196 that are engagable by the locking teeth 186 of the locking spline 184 when the locking spline is moved to the locked position, shown in FIG. 1, with the rollers 138 of the roller driver in engagement with a circular, planar surface 153 of the roller driver 152. A thrust bearing 200 is interposed between the shaft driver 152 and the locking spline 184 to thus permit rotation of the shaft driver along with the main shaft 38 with the locking spline being maintained non-rotatable about the enlarged section 176 of the main shaft by the stopping pin 180 and by the frictional resistance of other components.

The stopping pin is spring urged to the retracted position of FIG. 1 by a compression spring 202 that engages the outer perpherial surface of the locking spline 184 and with its upper end in force transmitting engagement with a shoulder defined by an enlarged head 204 of the stopping pin. At its retracted position, as shown in FIG. 2, upward movement of the stopping pin is restrained by a roll pin 206 with its mounted within transverse bores of the locking spline and is received through a transverse elongate slot 208 of the stopping pin. Thus, downward travel of the locking pin is also limited by the length of the elongate slot 208. Downward movement of the locking pin is accomplished by a tubular, solenoid mechanism 210 having a mounting section 212 which is threadedly received by an internally threaded opening 214 of the housing portion 168. The solenoid has a moveable plunger 216 which is adapted to forcibly engage the head 204 of the stopping pin and to force the stopping pin downwardly to the extended or stopping position against the force of the compression spring 202. The solenoid is actuated responsive to electrical signals from a proximity sensor 218 which is mounted to a hex standoff 220 by a cap screw 222 and electrical signals from the absolute encoder 30.

Figure 4:
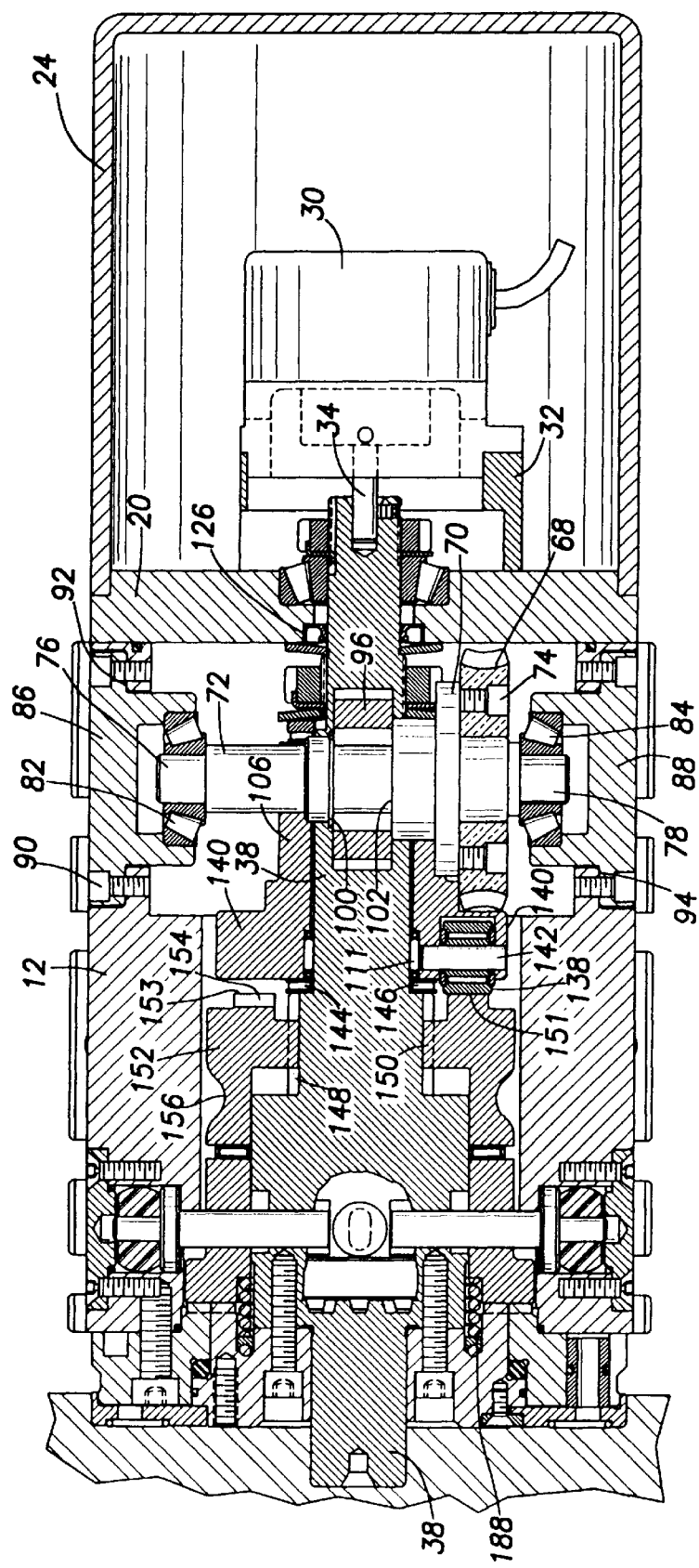
Figure 5:
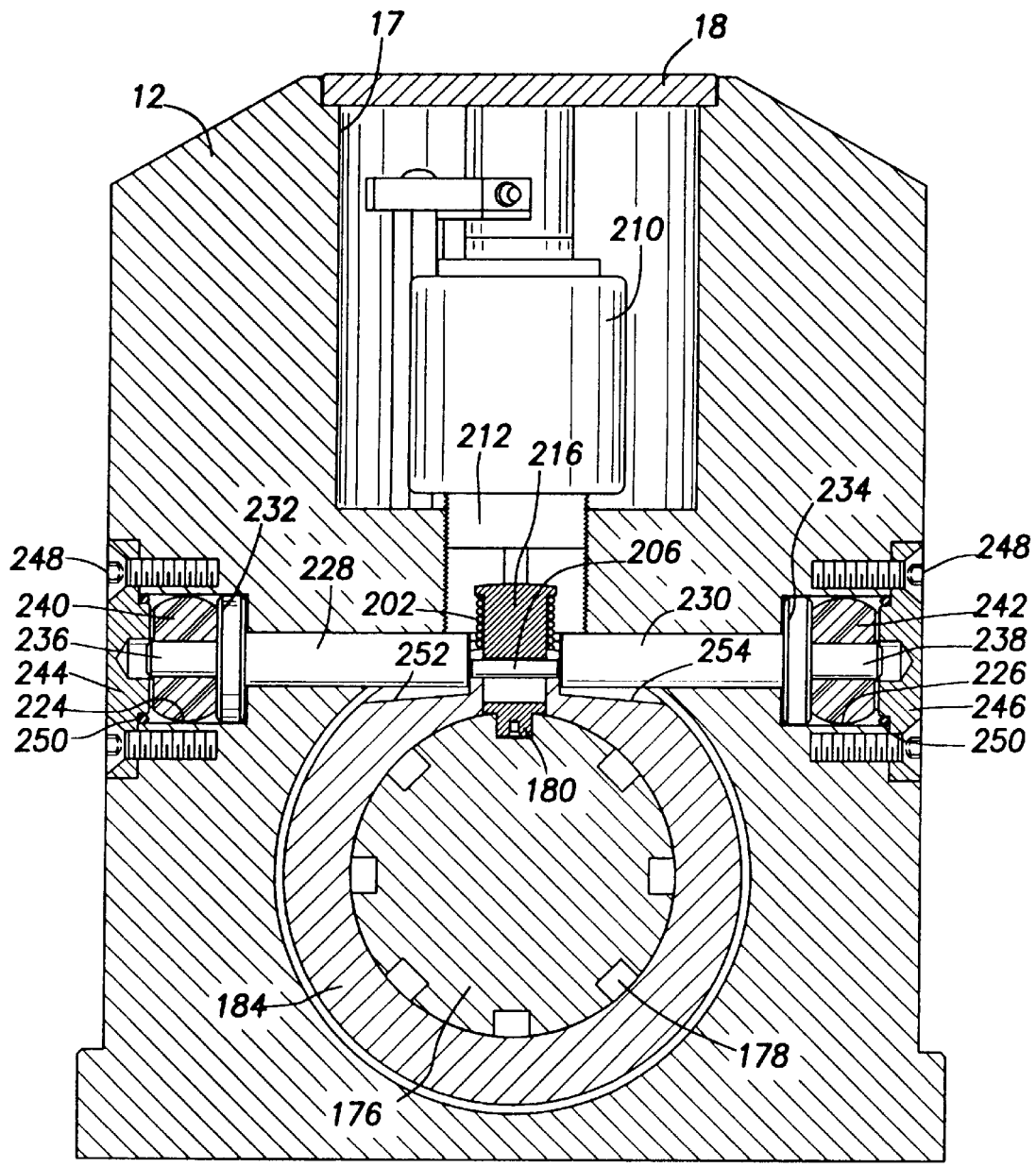
Figure 6:
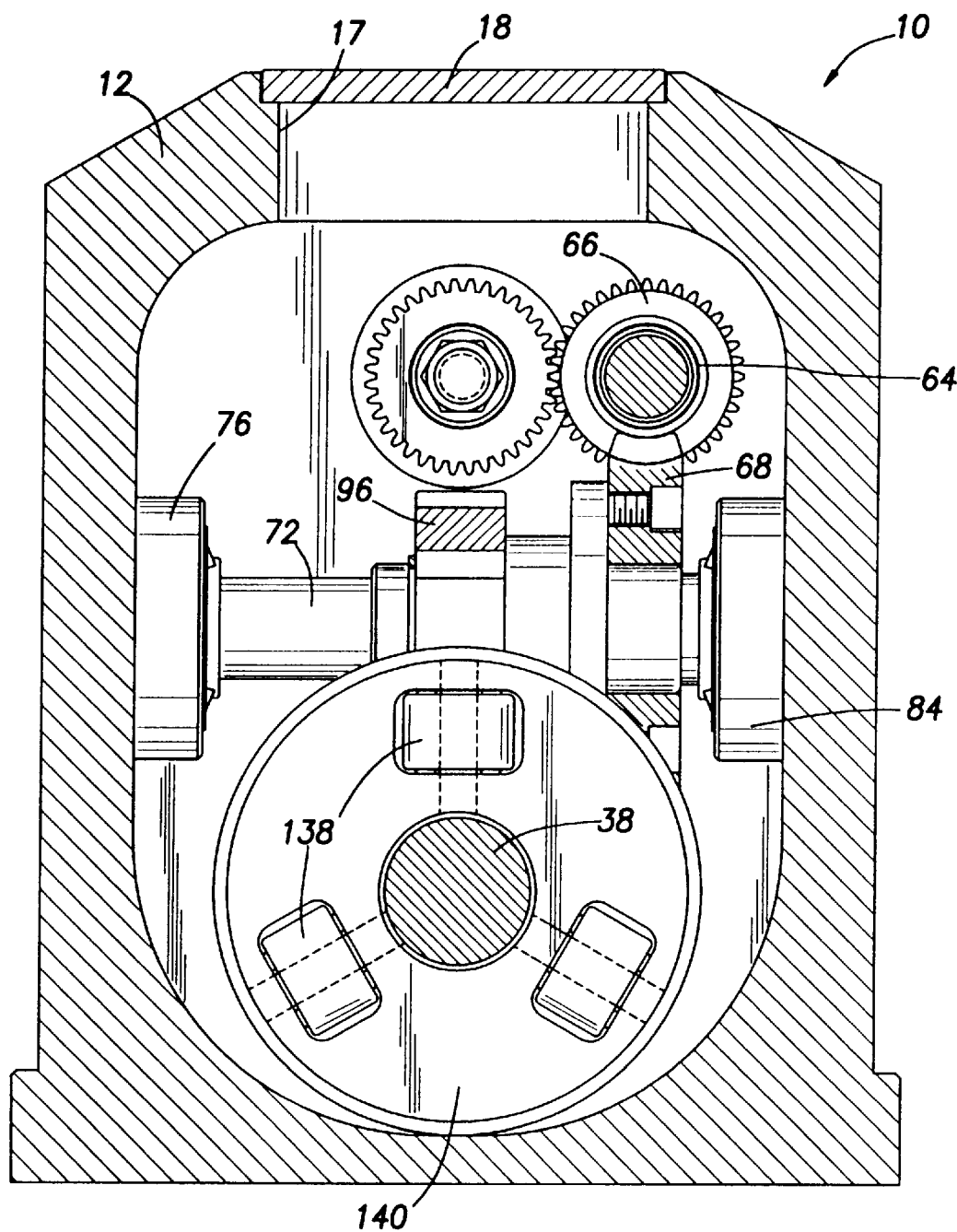

Referring now to FIGS. 3–5, the main housing block defines damping receptacles 224 and 226 within which are received damping rods 228 and 230 having enlarged, circular flanges 232 and 234 that engage internal shoulders of the main support block to restrain movement of the damping rods from the position shown in FIG. 5. The damping rods are provided with reduced diameter outward extensions 236 and 238 about which are received spring members 240 and 242 that are received within the damping receptacles 224 and 226. Preferably, the spring members may be composed of any suitable resilient material such as urethane or they may take any other suitable spring form without departing from the spirit and scope of this invention. The damping springs are retained in place by damping covers 244 and 246 that are secured in assembly with the main support block by a plurality of cap screws 248. The damping covers are sealed with respect to the main support block by o-ring seals 250.

It should be noted that the inner end portions of the damping rods are received within respective rod recesses 252 and 254 of the locking spline 184 with the recess surfaces being tapered so that the structure of the locking spline does not interfere with the damping rods as rotation of the indexing shaft and turret are suddenly stopped by the stopping pin thus causing limited rotation of the locking spline through which the stopping pin extends. It should also be noted that the roll pin 206 is positioned with its respective ends in engagement with respective inner ends of the damping rods 228 and 230 so that any force being applied to the ends of the roll pin will be transmitted to the damping rods and will result in compression of one of the urethane springs 240 or 242, depending upon the direction of the force. Thus, as the stopping pin is moved to the stopping position within the recesses 178 of the main shaft enlargement, the force of stopping rotation of the main shaft will be transmitted through the stopping pin and roll pin to the damping rods, thus damping the shaft stopping force. Some limited oscillation of the locking spline 184 can be caused as the indexing shaft is stopped, but the urethane springs will ensure that a precision stop position of the indexing shaft is achieved.

Figure 7:
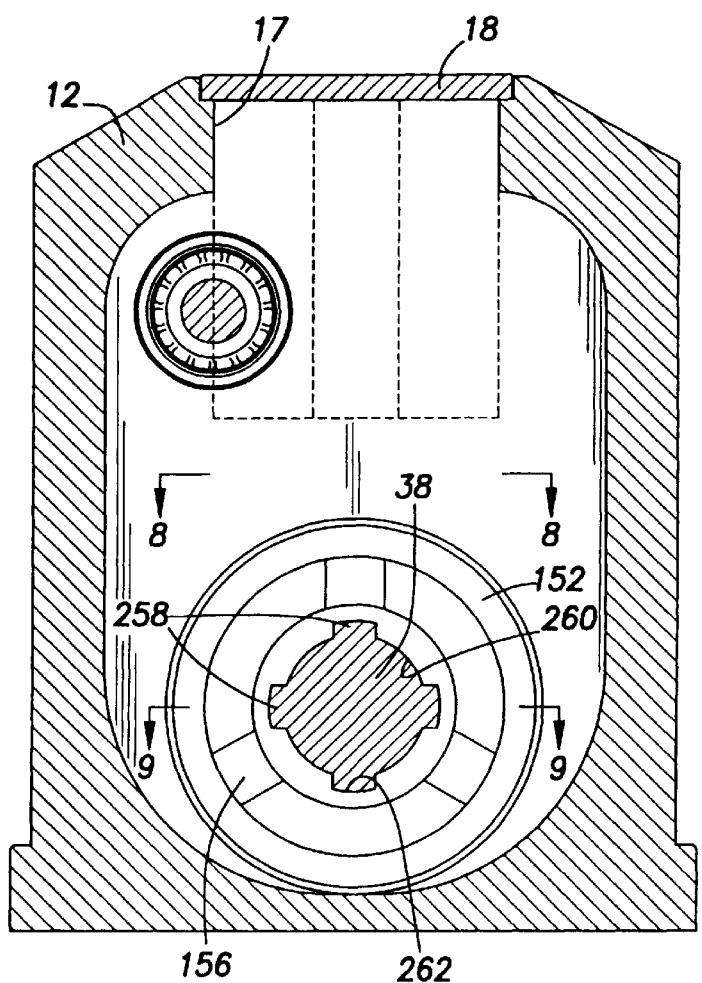
Figure 8:
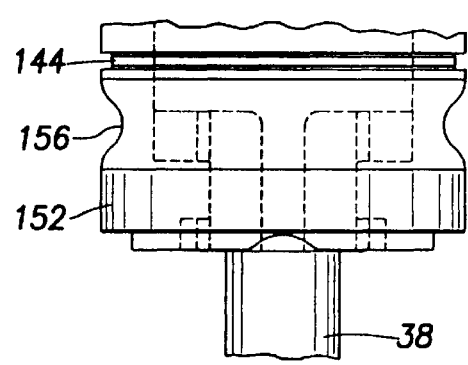
Figure 9:
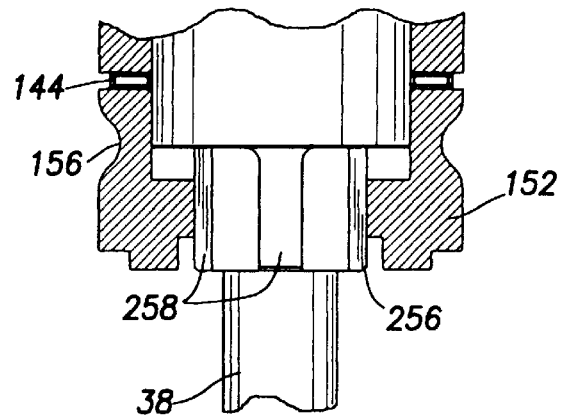

With reference now to FIGS. 7, 8 and 9 and FIGS. 24, 25 and 26, the geometry of the shaft driver 152 and its relationship with the splined section 256 of the main drive shaft 38 is shown in detail. As is shown in FIGS. 7 and 9, the main shaft 38 is provided with an externally splined section 256 having located thereon four parallel splines 258. Conversely, the shaft driver 152 defines a central opening 260 having four spline receptacles 262 within which the splines of the splined section of the main drive shaft are received. This splined connection enables relative linear movement of the indexing shaft and shaft driver while a non-rotatable driving relation is maintained between them to permit linear movement of the locking spline 184 by the roller driver and shaft driver to the locked or unlocked position relative to the positioning teeth 196 of the rotating spline 190 in opposition to or under the influence of the force of the compression spring assembly 188 as the case may be. The shaft driver also defines a circular, axially projecting rim 151 which defines the circular planar roller engagement surface 153 at one axial end of the shaft driver. This circular planar surface is interrupted by a plurality of roller recesses 154 for receiving a like number of spline positioning rollers 138 that are supported by the circular enlargement or flange 14 of the roller driver.

It is desirable to provide for line contact of the spline positioning rollers, rather than point contact, at the juncture of the curved roller recesses 154 with the circular planar roller engagement surface 153, and to thereby minimize wear of the positioning rollers and the shaft driver and thus enhance the effective service life of the spline locking and unlocking mechanism. This feature is accomplished by providing generally triangular roller transition surfaces 266 and 268 on the shaft driver which are located on either side of each of the respective roller recesses as shown. In absence of these roller transition surfaces, movement of the positioning rollers to or from the roller recesses and the planar circular surface 153 would result in point contact of the rollers with the shaft driver, consequently resulting in high mechanical loading at the points of contact. Since the positioning rollers are typically composed of material of greater hardness as compared to the roller driver, though such may not be so, the point loading under the influence of the spring assembly 188 would cause excessive wear of the roller driver. The transition surfaces 266 and 268, as the drive rollers are forced to transition the sides of the roller recess during both locking and unlocking rotation of the roller driver by the motor driven transmission, are designed to maintain line contact between the positioning rollers and the surface geometry of the shaft driver so that excessive wear of these spline positioning components does not occur.

Referring now to FIGS. 19 and 20, an alternative embodiment of the present invention shown generally at 270 employs a simplified geared transmission incorporating helical gears for establishing driving connection between the output shaft 46 of the drive motor 26 and the indexing drive shaft 38. In all other respects the bi-directional, motor driven, indexing turret mechanism is of the same construction and function as set forth in FIGS. 1–18. Thus, like parts are referred to by like reference numerals. As shown in FIG. 19, the back plate 20, which is removably assembled and sealed to the main housing block 12 defines an opening 50 within which is located a bearing mount 48 providing support for a thrust bearing 54 which accommodates the rotational thrust forces of the rotary output shaft 46 of the bi-directional motor 26. The motor mount 48 which accommodates the dimension of the opening 50 is sealed with respect to the back plate by an o-ring seal 49.

The output shaft 46 defines a reduced diameter section 271 to which a helical gear 272 is fixed and thus is rotatable along with the motor output shaft. The helical gear 272 is secured by a retainer nut 274 which is received by a threaded outer end portion of the output shaft. A helical gear 276, representing a reduction gear, is disposed in driven relation with the helical gear 272 and is fixed to the support flange 278 of a rotary shaft 280 by means of a plurality of retainer bolts 282. The retainer bolts also serve to mount another helical gear 284 in fixed relation with the rotary shaft 280. The shaft 280 is supported for rotation by bearings 279 and 281 which are in turn supported by the wall structure of the housing block and by the back plate 20 as shown. The helical gear 284 is disposed in driving relation with a helical gear 286, being a further reduction gear. The helical gear 286 is an integral component of a roller driver mechanism 288 having a circular enlargement 290 that is of the same construction and purpose as the circular enlargement 140 of the roller driver 106 that is set forth of the embodiment of FIGS. 1–18.

Referring now to FIGS. 21 and 22, a further alternative embodiment of the present invention is shown generally at 292 having a belt drive mechanism transferring rotary motion of the motor output shaft to rotary motion of the roller driver and thus also the main indexing shaft of the bi-directional, indexing turret mechanism. An aperture 50 in the back plate 20 receives a motor mount insert 48 which provides support for a roller bearing assembly 54. The motor mount insert defines a central opening through which extends the rotary motor output shaft 46. The output shaft is provided with a reduced diameter extremity 294 which is received within an axial recess that is defined within a hub 296 of a rotary shaft 300. The shaft is supported for rotation within the housing block 12 by a tapered bearing assembly 302 that is supported by wall structure 304 of the housing block. The opposite end of the rotary shaft 300 is supported by the bearing 54 and by the reduced diameter terminal end 294 of the motor output shaft. Set screws 298 establish a non-rotatable connection of the motor output shaft to the rotary shaft 300 as shown. The belt drive gear section 306 defines external gear teeth that receive the corresponding gear teeth 308 of a geared drive belt 310. The teeth of the geared drive belt are received in driving relation with the external gear teeth of the reduction gear section 312 which is an integral component of a roller driver 314. The roller driver defines an enlargement 316 of circular configuration which is of the same purpose and construction as the roller driver 140 that is shown in FIG. 1. The roller driver 314 is mounted for rotation about the main indexing shaft 38 in the same manner as discussed above and is adapted for imparting driving rotation to the main shaft via the shaft driver 152 as described above.

OPERATION

The typical condition of the apparatus of FIGS. 1–18 for the purpose of machining is the locked condition that is shown in FIG. 1. For the purpose of indexing a turret which is shown at "T" in FIG. 2, the unlocked and indexing condition of the apparatus is represented by FIG. 2. It should be noted that in the locked condition of the bidirectional, indexing turret mechanism of this invention, the rollers of the roller driver will have been driven by the helical gear 96 and the gear 84 to a position that the rollers are in engagement with the circular, planar surface 153 of the shaft driver 152 as shown in FIG. 1. In this condition, the shaft driver will have been moved to the left so that a wall surface of the contoured, circular groove 156 of the shaft driver thus causing the shaft driver positioning ball 158 to be moved upwardly as shown in FIG. 1 against the compression of its spring 162. Positioning of the shaft driver in this manner, acting through bearings 200, also causes positioning of the locking spline 184 so that its spline teeth are positioned in interengaged relation with the registering teeth 186 of the fixed spline 192 and the teeth 196 of the rotary spline 190. In the locked condition as shown in FIG. 1, the rotary spline 190, and the turret fixed thereto, will be locked against rotation so that a selected cutting tool of the tools that are mounted to the turret will be positioned at the designated machining station for cutting engagement with a workpiece being machined. In the locked condition of the indexing mechanism, it should borne in mind that the stopping pin 180 will be at its retracted position as shown in FIG. 1, so that its locking end 181 is not engaged within the indexing apertures 178 of the main shaft enlargement.

After a machining operation has been completed and it is desired to achieve indexing of the turret so as to locate another one of its supported machining tools at the machining station for machining the workpiece, the rotary spline 190 must be unlocked so that its rotation along with the indexing shaft will be permitted. Unlocking of the indexing mechanism is accomplished by energizing the electric indexing motor 26 causing its output shaft 46 to impart rotation to the transmission that establishes driving interconnection between the motor output shaft and the roller driver. The direction of rotation of the bi-directional, electric motor 26 will be controlled by the absolute encoder 30 which selects the direction of rotation that achieves the least distance of rotational movement of the turret from its present position to the selected position. Obviously, the selected position can be selected manually or it can be selected electronically via the absolute encoder shown at 30.

As the electric motor 26 is operated, the transmission causes the helical gear 96 to impart rotation to the gear 104 that is an integral component of the roller driver 106. As the roller driver is rotated, thereby rotating its enlarged roller support flange 140, the rollers 138 will roll along the circular, planar surface 153 of the circular rim 151 until the rollers become aligned with the respective roller recesses 154 of the shaft driver 152. When the rollers 138 move into registry with the roller recesses, the driver positioning ball 158, applying force via its spring 162 to an inclined surface of the circular groove 156 of the shaft driver, will impart a lateral force to the shaft driver thus moving the shaft driver 152 linearly along the indexing shaft until the positioning ball 158 is centered with respect to the circular groove 156. It should be borne in mind that, though the shaft driver is moveable linearly with respect to the main indexing shaft 38 by both locking and unlocking movement, its rotary driving relationship with respect to the main indexing shaft is maintained by the splined, interconnection of the shaft driver with the indexing shaft shown particularly in FIGS. 7–9. The shaft driver is also moved to the right for unlocking by the force of the spring assembly 188 which acts directly on the locking spline. As the locking spline is moved to the right by the force of the spring assembly, its spline teeth 186 are withdrawn from the interengaged relation with the spline teeth of the fixed spline 192 and the rotary spline 190. Movement of the shaft driver and locking spline to the right will occur until the unlocked position of FIG. 2 has been achieved and the positioning ball 158 is centered within the circular groove 156.

After unlocking of the locking spline and shaft driver, the rollers 138 will be positioned within their respective recesses 154 as shown in FIG. 2 and thus will establish a driving engagement of the roller driver with the shaft driver so that rotation of the roller driver 106 in either rotational direction thereof, will impart consequent rotation to the shaft driver in the same rotary direction. As this rotation of the shaft driver takes place, by virtue of the splined interconnection of the shaft driver with the splines of the indexing shaft 38, the indexing shaft will be rotated along with the roller driver and shaft driver causing rotation of the rotary spline 190, until the selected indexed position, determined by the encoder, has been established.

When the proximity sensor 218 and the encoder 30 indicate the proper position of the indexing enlargement 176 of the main indexing shaft, the proximity switch 170 will be activated and electric signals will be provided to energize the solenoid 210 thereby driving its plunger 216 downwardly against the head of the stopping pin 180 thereby causing the lower, stopping portion 181 of the stopping pin to move into stopping engagement within a respective one of the indexing apertures 178, being the position shown in FIG. 5. When the stopping pin is engaged with the indexing apertures 176 of the main indexing shaft, further rotation of the indexing shaft will not be permitted.

At this point in the operational movement, it should be borne in mind that the indexing shaft and its gearing, together with the roller driver and shaft driver as well as the rotary spline and the turret and tooling secured thereto will have considerable mass. When the rotation of this mass is stopped rather instantaneously by sudden engagement of the stopping pin within the indexing apertures 178, there is a need to provide cushioning of the sudden force that is applied between the indexing shaft and housing through the stopping pin. As mentioned above, and as shown and described in connection with FIG. 5, the shock force of stopping rotation of the indexing shaft will be accommodated by a force damping mechanism including urethane damping springs 240 and 242 to which force is transmitted by damping rods 228 and 230 from the stopping pin and locking spline.

After rotation of the indexing shaft 38 has ceased and the rotary position of the indexing shaft has become stabilized by the damping mechanism, the indexing mechanism will be in condition for returning from the unlocked position shown in FIG. 2 to the locking position shown in FIG. 1. Since rotation of the indexing shaft is restrained by the stopping pin and its damping mechanism in the condition shown in FIG. 5, relocking activity occurs simply upon rotation of the roller driver by the motor and transmission in either rotational direction of the roller driver. As the roller driver is rotated by the helical gear 96 acting on the gear 104 of the roller driver, the rollers 138 will roll against one of the inclined side surfaces of the roller recesses 154. Since linear movement of the roller driver relative to the main shaft is restrained by the roller driver spring and adjustment assembly, the force of the rollers 138 against the roller recess surfaces will cause the shaft driver 152 to move to the left toward its locking position. This movement of the shaft driver will cause the positioning ball 158 to be moved along an inclined surface of the circular groove 156 toward the position shown in FIG. 1, against the compression of its spring 162. Likewise, force will be transmitted from the shaft driver 152 through the bearing assembly 220 to the locking spline 184 thereby forcing the locking spline to also move to the left, against the force of the spring assembly 188, returning it to the locked condition thereof relative to the spline teeth of the fixed and rotary splines. Thus, the locking spline 84 returns to its locked position as shown in FIG. 1 and during such locking movement causes compression of the spring assembly 188 so that the spring assembly can subsequently move the locking spline from its locked position to its unlocked position when the indexing mechanism is subsequently unlocked.

It should be borne in mind that the transmission mechanism shown in FIGS. 1–18, the simplified transmission mechanism shown in FIGS. 19 and 20 and the belt drive transmission shown in FIGS. 21 and 22 will function in the same manner to impart locking and unlocking movement to the indexing mechanism and to impart controlled rotation to the indexing shaft in the manner described above. These alternative embodiments are therefore provided herein simply to indicate that other transmissions may be employed to transmit the rotary force of the electric motor 26 to the roller driver for the purpose of unlocking, indexing and relocking the indexing mechanism in automated fashion to quickly and selectively position the turret for selected machining operations.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A bidirectional indexing turret mechanism for machine tools, comprising:
    (a) a housing adapted for mounting to a machine tool and having first locking means in fixed relation therewith;
    (b) an indexing shaft being mounted for rotation within said housing;
    (c) a rotary turret support being fixed to said indexing shaft and defining second locking means;
    (d) third locking means being movable relative to said indexing shaft to a locking position establishing locking engagement with said first and second locking means and being movable to an unlocked position permitting rotation of said rotary turret support;
    (e) a shaft driver having splined engagement with said indexing shaft and being operative to move said third locking means to said locking position, said shaft driver defining a positioning end having drive receptacles formed therein;
    (f) a roller driver being located about said indexing shaft and supporting a plurality of drive rollers having selective positioning engagement with said positioning end of said shaft driver and selective positioning engagement within said drive receptacles, said roller driver defining a gear;

(g) a bidirectional rotary motor being mounted to said housing and having a rotary output shaft;

(h) a transmission having rotary driven connection with said output shaft of said bidirectional motor and having rotary driving connection with said gear of said roller driver; and (i) means for selectively stopping indexing rotation of said indexing shaft.

2. The bi-directional indexing turret mechanism of claim 1, wherein:

(a) said first locking means being a locking element fixed to said housing and having an array of locking teeth defined thereon;

(b) said second locking means being an array of locking teeth being defined on said rotary turret support; and (c) said third locking means being a locking element disposed about said indexing shaft and defining an array of locking teeth oriented for simultaneous locking engagement with the array of locking teeth of said first and second locking means.

3. The bi-directional indexing turret mechanism of claim 2, wherein:

urging means acting continuously on said locking element and urging said locking element toward said unlocked position thereof.

4. The bi-directional indexing turret mechanism of claim 1, wherein:

means urging said third locking means to said unlocking position thereof in absence of locking positioning of said third locking means by said shaft driver and roller driver.

5. The bi-directional indexing turret mechanism of claim 1, wherein:

(a) said shaft driver being of circular configuration and defining an external circular positioning groove; and (b) a shaft driver positioner being connected to said housing and having a spring urged positioning ball acting within said circular positioning groove to impart a positioning force to said shaft driver for returning said shaft driver from the locking position thereof.

6. The bi-directional indexing turret mechanism of claim 1, wherein:

(a) said third locking means being a locking ring positioned about said indexing shaft and being linearly movable relative to said indexing shaft to said locking and unlocking positions thereof; and (b) said array of locking teeth of said third locking ring being a circular array of locking teeth facing axially and being of a dimension for simultaneous locking engagement with said locking teeth of said first and second locking means.

7. The bi-directional indexing turret mechanism of claim 1, wherein:

(a) said third locking means and said shaft driver each being positioned about said indexing shaft and being linearly movable relative to said indexing shaft, said shaft driver being disposed in axial force transmitting relation with said third locking means; and (b) a thrust bearing being interposed between said third locking means and said shaft driver and permitting rotation of said shaft driver relative to said third locking means while transmitting axial force from said shaft driver to said third locking means.

8. The bi-directional indexing turret mechanism of claim 1, wherein:

(a) said positioning end of said shaft driver being defined by a circular axially facing projection having a circular roller engaging surface; and (b) said drive receptacles being defined within said circular axially facing projection, interrupting said circular roller engaging surface and being of a configuration for receiving said drive rollers of said roller driver and permitting linear movement of said third locking means to said unlocking position, when said drive rollers are engaged within said drive receptacles said rollers imparting driving rotation to said shaft driver and through said splined interconnection of said shaft driver with said indexing shaft imparting driving rotation to said indexing shaft.

9. The bi-directional indexing turret mechanism of claim 8, wherein:

(a) said indexing shaft defining a plurality of equally spaced indexing apertures therein;

(b) a stopping element being located within said housing adjacent said indexing apertures and being movable from a retracted position where said stopping element is clear of said indexing apertures to a stopping position where said stopping element is engaged within a selected one of said indexing apertures; and (c) means for selectively moving said stopping element to said stopping position and to said retracted position.

10. The bi-directional indexing turret mechanism of claim 1, wherein:

(a) shaft positioning means establishing adjustable axial positioning of said indexing shaft relative to said housing for precision location of said rotary turret support relative to said housing; and (b) roller driver positioning means being adjustably connected with said indexing shaft and permitting precision force transmitting adjustment of said roller driver relative to said indexing shaft for precision locking and unlocking movement of said shaft driver and said third locking means relative to said indexing shaft.

11. The bi-directional indexing turret mechanism of claim 10, said shaft position means comprising:

(a) a bearing supporting one end of said indexing shaft for rotation relative to said housing; and (b) a first adjustment thread being defined by said indexing shaft; and (c) an adjustment element being adjustably received by said first adjustment thread and providing for precision adjustment of said indexing shaft relative to said bearing.

12. The bi-directional indexing turret mechanism of claim 11, said roller driver positioning means comprising:

(a) a second adjustment thread being defined by said indexing shaft;

(b) a second bearing positioned about said indexing shaft and having force transmitting engagement with said roller driver;

(c) resilient means having force transmitting engagement with said second bearing; and (d) an adjustment element being received by said second adjustment thread and having precision positioning engagement with said resilient means for precision adjustment of positioning force being applied by said resilient means to said roller driver and through said roller driver to said shaft driver and said third locking means.

13. The bi-directional indexing turret mechanism of claim 1, said transmission comprising:
   (a) a rotatable jack shaft having bearing support within said housing and being oriented in transverse relation with said indexing shaft;
   (b) a worm gear mechanism being driven by said output shaft of said bidirectional motor and having driving relation with said jack shaft;
   (c) said gear of said roller driver being a helical gear; and
   (d) a helical gear being rotatable by said jack shaft and having driving engagement with said helical gear of said roller driver.

14. The bidirectional indexing turret mechanism of claim 1, said transmission comprising:
   (a) said gear of said roller driver being a helical gear; and
   (b) a helical gear mechanism having a plurality of helical gears being driven by said output shaft of said bidirectional motor and having driving engagement with said helical gear of said roller driver.

15. The bidirectional indexing turret mechanism of claim 1, said transmission comprising:
   (a) a belt drive gear being driven by said output shaft of said bidirectional motor;
   (b) said gear of said roller driver being a belt driven gear; and
   (c) a geared drive belt being disposed in driven relation with said belt drive gear and in driving relation with said belt driven gear.

16. A bidirectional indexing turret mechanism for machine tools, comprising:
   (a) a housing adapted for mounting to a machine tool and having a first locking spline in fixed relation therewith and defining a circular array of locking teeth;
   (b) an indexing shaft being mounted by bearings for rotation within said housing and defining a plurality of indexing apertures in circumferentially spaced location thereon;
   (c) a rotary turret support being fixed to said indexing shaft and defining a second locking spline having a circular array of locking teeth thereon disposed for coaxial registry with said circular array of locking teeth of said first locking spline;
   (d) a third locking spline being positioned about said indexing shaft and having a circular array of locking teeth, said third locking spline being linearly movable to a locking position establishing locking engagement with said circular arrays of locking teeth of said fixed spline and said second locking spline and being movable to an unlocked position permitting rotation of said rotary turret support and said indexing shaft;
   (e) a shaft driver being positioned about said indexing shaft and having splined engagement with said indexing shaft, said shaft driver upon linear movement toward said third locking spline moving said third locking spline to said locking position, said shaft driver defining a circular positioning end having a circular end surface and having drive receptacles formed therein;
   (f) a roller driver being located about said indexing shaft and supporting a plurality of drive rollers having selective positioning engagement with said circular positioning end of said shaft driver and having selective positioning engagement within said drive receptacles, said roller driver defining a gear;
   (g) a bidirectional rotary motor being mounted to said housing and having a rotary output shaft;
   (h) a transmission having rotary driven connection with said output shaft of said bidirectional motor and having rotary driving connection with said gear of said roller driver; and
   (i) a stopping pin being movably disposed within said housing and being movable to stopping position within a selected indexing aperture of said indexing shaft for selectively stopping indexing rotation of said indexing shaft.

17. The bi-directional indexing turret mechanism of claim 16, comprising:
   a spring assembly urging said third locking spline to said locking position thereof in absence of locking positioning of said third locking spline by said shaft driver and roller driver.

18. The bidirectional indexing turret mechanism of claim 16, comprising:
   (a) said shaft driver being of circular configuration and defining an external circular positioning groove; and
   (b) a shaft driver positioner being connected to said housing and having a spring urged positioning ball acting within said circular positioning groove to impart a positioning force to said shaft driver for returning said shaft driver from the locking position thereof.

19. The bi-directional indexing turret mechanism of claim 16, comprising;
   (a) said third locking spline and said shaft driver each being positioned about said indexing shaft and being linearly movable relative to said indexing shaft, said shaft driver being disposed in axial force transmitting relation with said third locking spline; and
   (b) a rust bearing being interposed between said third locking spline and said shaft driver and permitting rotation of said shaft driver relative to said third locking spline while transmitting axial force from said shaft driver to said third locking spline.

20. The bi-directional indexing turret mechanism of claim 16, comprising:
   (a) shaft positioning means establishing adjustable axial positioning of said indexing shaft relative to said housing for precision location of said rotary turret support relative to said housing; and
   (b) roller driver positioning means being adjustably connected with said indexing shaft and permitting precision force transmitting adjustment of said roller driver relative to said indexing shaft for precision locking and unlocking movement of said shaft driver and said third locking spline relative to said indexing shaft.

21. The bi-directional indexing turret mechanism of claim 16, comprising:
   (a) a bearing supporting one end of said indexing shaft for rotation relative to said housing;
   (b) a first adjustment thread being defined by said indexing shaft;
   (c) an adjustment element being adjustably received by said first adjustment thread and providing for precision adjustment of said indexing shaft relative to said bearing;
   (d) a second adjustment thread being defined by said indexing shaft;
   (e) a second bearing positioned about said indexing shaft and having force transmitting engagement with said roller driver;
   (f) resilient means having force transmitting engagement with said second bearing; and (g) an adjustment element being received by said second adjustment thread and having precision positioning engagement with said resilient means for precision adjustment of positioning force being applied by said resilient means to said roller driver and through said roller driver to said shaft driver and said third locking spline.

22. The bi-directional indexing turret mechanism of claim 16, said transmission comprising:
   (a) a rotatable jack shaft having bearing support within said housing and being oriented in transverse relation with said indexing shaft;
   (b) a worm gear mechanism being driven by said output shaft of said bidirectional motor and having driving relation with said jack shaft;
   (c) said gear of said roller driver being a helical gear; and
   (d) a helical gear being rotatable by said jack shaft and having driving engagement with said helical gear of said roller driver.

23. The bi-directional indexing turret mechanism of claim 16, said transmission comprising:
   (a) said gear of said roller driver being a helical gear; and
   (b) a helical gear mechanism having a plurality of helical gears being driven by said output shaft of said bidirectional motor and having driving engagement with said helical gear of said roller driver.

24. The bi-directional indexing turret mechanism of claim 16, said transmission comprising:
   (a) a belt drive gear being driven by said output shaft of said bidirectional motor;
   (b) said gear of said roller driver being a belt driven gear; and
   (c) a geared drive belt being disposed in driven relation with said belt drive gear and in driving relation with said belt driven gear.

* * * * *